(12) United States Patent
Blangero et al.

(10) Patent No.: US 12,362,350 B2
(45) Date of Patent: *Jul. 15, 2025

(54) LITHIUM NICKEL MANGANESE COBALT COMPOSITE OXIDE AS A POSITIVE ELECTRODE ACTIVE MATERIAL FOR RECHARGEABLE LITHIUM ION BATTERIES

(71) Applicants: UMICORE, Brussels (BE);
UMICORE KOREA LTD., Chungcheongnam-do (KR)

(72) Inventors: Maxime Blangero, Chungcheongnam-do (KR); KyungSub Jung, Chungcheongnam-do (KR); Bin-Na Yun, Chungcheongnam-do (KR); Olesia Karakulina, Chungcheongnam-do (KR)

(73) Assignees: UMICORE, Brussels (BE);
UMICORE KOREA LTD., Chungcheongnam-do (KR)

(*) Notice: Subject to any disclaimer, the term of this patent is extended or adjusted under 35 U.S.C. 154(b) by 712 days.

This patent is subject to a terminal disclaimer.

(21) Appl. No.: 17/623,729

(22) PCT Filed: Jul. 2, 2020

(86) PCT No.: PCT/EP2020/068728
§ 371 (c)(1),
(2) Date: Dec. 29, 2021

(87) PCT Pub. No.: WO2021/001503
PCT Pub. Date: Jan. 7, 2021

(65) Prior Publication Data
US 2022/0271282 A1     Aug. 25, 2022

(30) Foreign Application Priority Data

Jul. 3, 2019  (EP) .................................... 19184165
Jul. 3, 2019  (EP) .................................... 19184186

(51) Int. Cl.
*H01M 4/36*    (2006.01)
*C01G 53/50*   (2025.01)
(Continued)

(52) U.S. Cl.
CPC ............ *H01M 4/366* (2013.01); *C01G 53/50* (2013.01); *H01M 4/0471* (2013.01);
(Continued)

(58) Field of Classification Search
CPC .... H01M 4/366; H01M 4/0471; H01M 4/131; H01M 4/364; H01M 4/505; H01M 4/525; H01M 10/0525
(Continued)

(56) References Cited

U.S. PATENT DOCUMENTS 10,790,510 B2   9/2020  Kim et al.
12,002,954 B2   6/2024  Fukamichi et al.
(Continued)

FOREIGN PATENT DOCUMENTS

CN   102627332 A   8/2012
CN   102832389 A   12/2012
(Continued)

OTHER PUBLICATIONS

ISA/EP; International Search Report and Written Opinion for International Patent Application No. PCT/EP2020/068728 dated Sep. 18, 2020, 9 pages.
(Continued)

*Primary Examiner* — Christian Roldan
*Assistant Examiner* — Robert Gene West
(74) *Attorney, Agent, or Firm* — NK Patent Law

(57) ABSTRACT

A positive electrode active material powder suitable for lithium-ion batteries comprises lithium transition metal-based oxide particles, said particles comprising a core and a surface layer, said surface layer being on top of said core,
(Continued)

said particles comprising the elements: Li, M' and oxygen, wherein M' has a formula: M'=Ni$_z$Mn$_y$Co$_x$A$_k$, wherein A is a dopant, $0.60 \leq z \leq 0.89$, $0.05 \leq y \leq 0.20$, $0.05 \leq x \leq 0.20$, $x+y+z+k=1$, and $k \leq 0.01$. The positive electrode active material powder has a median particle size D50 ranging from 5 μm to 15 μm, a span ranging from 0.25 to 0.90, and a surface layer thickness ranging from 10 nm to 200 nm. The surface layer comprises:

sulfur in a content superior or equal to 0.150 wt % and inferior or equal to 0.375 wt % with respect to the total weight of the positive electrode active material powder, and aluminum in a content superior or equal to 0.05 wt % and inferior or equal to 0.15 wt % with respect to the total weight of the positive electrode active material powder.

15 Claims, 6 Drawing Sheets

(51) Int. Cl.

| | | |
|---|---|---|
| *H01M 4/02* | (2006.01) | |
| *H01M 4/04* | (2006.01) | |
| *H01M 4/131* | (2010.01) | |
| *H01M 4/505* | (2010.01) | |
| *H01M 4/525* | (2010.01) | |
| *H01M 4/58* | (2010.01) | |
| *H01M 10/0525* | (2010.01) | |

(52) U.S. Cl.
CPC ........... *H01M 4/131* (2013.01); *H01M 4/364* (2013.01); *H01M 4/505* (2013.01); *H01M 4/525* (2013.01); *H01M 4/5815* (2013.01); *H01M 10/0525* (2013.01); *C01P 2002/01* (2013.01); *C01P 2002/52* (2013.01); *C01P 2002/54* (2013.01); *C01P 2002/85* (2013.01); *C01P 2004/03* (2013.01); *C01P 2004/51* (2013.01); *C01P 2004/61* (2013.01); *C01P 2004/80* (2013.01); *C01P 2006/40* (2013.01); *H01M 2004/021* (2013.01); *H01M 2004/028* (2013.01); *H01M 2220/20* (2013.01)

(58) Field of Classification Search
USPC .......................................................... 429/209
See application file for complete search history.

(56) References Cited

U.S. PATENT DOCUMENTS

| | | | |
|---|---|---|---|
| 2003/0035999 A1 | 2/2003 | Gao et al. | |
| 2004/0157127 A1* | 8/2004 | Choi | H01M 4/623 |
| | | | 429/61 |
| 2004/0258836 A1 | 12/2004 | Besenhard et al. | |
| 2008/0193846 A1* | 8/2008 | Morishima | H01M 4/485 |
| | | | 427/126.3 |
| 2012/0074351 A1* | 3/2012 | Levasseur | H01M 4/1391 |
| | | | 252/182.1 |
| 2015/0093641 A1 | 4/2015 | Mitsumoto et al. | |
| 2015/0104708 A1 | 4/2015 | Bi et al. | |
| 2015/0357678 A1* | 12/2015 | Tsubouchi | H01M 4/485 |
| | | | 429/200 |
| 2016/0099460 A1* | 4/2016 | Toyama | H01M 4/525 |
| | | | 429/223 |
| 2016/0351900 A1 | 12/2016 | Sekiya et al. | |
| 2016/0380263 A1* | 12/2016 | Nakayama | H01M 4/366 |
| | | | 429/223 |
| 2017/0179479 A1 | 6/2017 | Park et al. | |
| 2017/0294651 A1 | 10/2017 | Choi et al. | |
| 2017/0309909 A1 | 10/2017 | Paulsen et al. | |
| 2018/0019464 A1* | 1/2018 | Xia | H01M 10/0525 |
| 2018/0034045 A1 | 2/2018 | Xia et al. | |
| 2018/0269477 A1* | 9/2018 | Zhu | C01G 53/006 |
| 2018/0316008 A1 | 11/2018 | Arimura et al. | |
| 2019/0123347 A1 | 4/2019 | Kim et al. | |
| 2019/0173084 A1* | 6/2019 | Dahl | H01M 4/136 |
| 2020/0144610 A1* | 5/2020 | Hong | H01M 4/525 |

FOREIGN PATENT DOCUMENTS

| | | |
|---|---|---|
| CN | 103715424 A | 4/2014 |
| CN | 104347853 A | 2/2015 |
| CN | 106058188 A | 10/2016 |
| CN | 107207281 A | 9/2017 |
| CN | 107210422 A | 9/2017 |
| CN | 108023077 A | 5/2018 |
| CN | 108807887 A | 11/2018 |
| CN | 109037649 A | 12/2018 |
| CN | 109075327 A | 12/2018 |
| CN | 109256533 A | 1/2019 |
| EP | 3428124 A1 | 1/2019 |
| JP | 2001006672 A | 1/2001 |
| JP | 2002015739 A | 1/2002 |
| JP | 2003020229 A | 1/2003 |
| JP | 2006073482 A | 3/2006 |
| JP | 2008166269 A | 7/2008 |
| JP | 2009146739 A | 7/2009 |
| JP | 2010129471 A | 6/2010 |
| JP | 5204913 B1 | 6/2013 |
| JP | 5251401 B2 | 7/2013 |
| JP | 5584456 B2 | 9/2014 |
| JP | 2015069958 A | 4/2015 |
| JP | 2017506805 A | 3/2017 |
| JP | 2018506141 A | 3/2018 |
| JP | 2018508943 A | 3/2018 |
| JP | 2018510450 A | 4/2018 |
| JP | 2018106892 A | 7/2018 |
| JP | 2019021623 A | 2/2019 |
| JP | 2019509605 A | 4/2019 |
| JP | 2022504208 A | 1/2022 |
| WO | 2013021955 A1 | 2/2013 |
| WO | 2015065098 A2 | 5/2015 |
| WO | 2016055911 A1 | 4/2016 |
| WO | 2016116862 A1 | 7/2016 |
| WO | 2016116867 A1 | 7/2016 |
| WO | 2017055977 A1 | 4/2017 |
| WO | 2017078136 A1 | 5/2017 |
| WO | 2017055977 | 6/2017 |
| WO | 2017168274 A1 | 10/2017 |
| WO | 2018158078 A1 | 9/2018 |

OTHER PUBLICATIONS

WIPO; International Preliminary Report on Patentability for International Patent Application No. PCT/EP2020/068728 dated May 10, 2021, 7 pages.

USPTO: Non-final Office Action for co-pending U.S. Appl. No. 17/623,676, mailed Aug. 1, 2024, 32 pages.

USPTO: Non-final Office Action for co-pending U.S. Appl. No. 17/623,688, mailed Aug. 5, 2024, 48 pages.

USPTO: Non-final Office Action for co-pending U.S. Appl. No. 17/623,694 mailed Sep. 12, 2024, 40 pages.

USPTO: Non-final Office Action for co-pending U.S. Appl. No. 17/623,720, mailed Aug. 6, 2024, 33 pages.

USPTO: Non-final Office Action for U.S. Appl. No. 17/623,682, mailed Oct. 31, 2024, 39 pages.

USPTO: Final Office Action for U.S. Appl. No. 17/623,694, mailed Jan. 13, 2025, 29 pages.

\* cited by examiner

LITHIUM NICKEL MANGANESE COBALT COMPOSITE OXIDE AS A POSITIVE ELECTRODE ACTIVE MATERIAL FOR RECHARGEABLE LITHIUM ION BATTERIES

CROSS-REFERENCE TO RELATED APPLICATIONS

This application is a U.S. National Stage application of International Patent Application No. PCT/EP2020/068728, filed on Jul. 2, 2020, which claims the benefit of European Patent Application No. 19184165.9, filed on Jul. 3, 2019, and the benefit of European Patent Application No. 19184186.5, filed on Jul. 3, 2019.

TECHNICAL FIELD AND BACKGROUND

This invention relates to a lithium nickel (manganese) cobalt-based oxide positive electrode active material powder for lithium-ion secondary batteries (LIBs) suitable for electric vehicle (EV) and hybrid electric vehicle (HEV) applications, comprising lithium transition metal-based oxide particles having a core provided with a surface layer on top of the core. The surface layer comprises sulfate ion ($SO_4^{2-}$). The particles comprises the elements: Li, a metal M' and oxygen, wherein the metal M' has a formula M'=$Ni_zMn_yCo_xA_k$, wherein A is a dopant, $0.60 \leq z \leq 0.90$, $0.05 \leq y \leq 0.20$, $0.05 \leq x \leq 0.20$, $x+y+z+k=1$, and $k \leq 0.01$.

In particular, the present invention concerns a high nickel (manganese) cobalt-based oxide positive electrode active material—hereafter referred to as "hN(M)C compound"—i.e. a hN(M)C compound wherein the atomic ratio of Ni to M' is of at least 50.0% (or 50.0 at %), preferably of at least 55.0% (or 55.0 at %), more preferably of at least 60.0% (or 60.0 at %).

In the framework of the present invention, at % signifies atomic percentage. The at % or "atom percent" of a given element expression of a concentration means how many percent of all atoms in the claimed compound are atoms of said element.

The weight percent (wt %) of a first element E ($E_{wt1}$) in a material can be converted from a given atomic percent (at %) of said first element E ($E_{at1}$) in said material by applying the following formula:

$$E_{wt1} = \frac{(E_{at1} \times E_{aw1})}{\sum_{i=1}^{n} (E_{ati} \times E_{awi})} \times 100\%,$$

wherein the product of $E_{at1}$ with $E_{aw1}$, $E_{aw1}$ being the atomic weight (or molecular weight) of the first element E, is divided by the sum of $E_{ati} \times E_{awi}$ for the other elements in the material. n is an integer which represents the number of different elements included in the material.

Along with the developments of EVs and HEVs, it comes a demand for lithium-ion batteries eligible for such applications and the hN(M)C-class of compounds is more and more explored as a solid candidate to be used as positive electrode active materials of LIBs, because of its relatively cheap cost (with respect to alternatives such as lithium cobalt-based oxides, etc.) and higher capacities at higher operating voltages.

Such a hN(M)C compound is already known, for example, from the document JP5584456B2—hereafter referred to as "JP'456"—or JP5251401B2—hereafter referred to as "JP'401"—.

JP'456 discloses a hN(M)C compound having $SO_4^{2-}$ ion (e.g. sulfuric acid radicals according to JP'456 phrasing) at a surface layer of the particles of said hN(M)C compound in a content ranging from 1000 ppm to 4000 ppm. JP'456 explains that when the amount of sulfuric acid radicals is within the above-mentioned range, there is an increase in the capacity retention rate and the discharge capacity properties of the compound. However, if the amount of sulfuric acid radicals is less than the above-mentioned range, there is a reduction in the capacity retention rate, while if this amount exceeds the above-mentioned range, there is a reduction of the discharge capacity.

JP'401 teaches that applying a sulfate coating, in particular a lithium sulfate coating, on primary particles allows to design secondary particles, resulting from the aggregation of said sulfate coated primary particles, having a specific pore structure allowing to confer to the hN(M)C compound made from said secondary particles higher cycle durability and a higher initial discharge capacity. JP'401 explains moreover that such specific pore structure is achieved once said sulfate coating is washed and removed.

Although hN(M)C compounds are promising for the above-mentioned advantages, they also present disadvantages such as a deterioration of the cycling stability, due to their high Ni contents.

As an illustration of these drawbacks, the hN(M)C compounds of the prior art have either a low first discharge capacity which is not superior to 180 mAh/g (JP'456) or a limited capacity retention of maximum 86% (JP'401).

Presently, there is therefore a need to achieve hN(M)C compounds having sufficiently high first discharge capacity (i.e. of at least 200 mAh/g), which is, according to the present invention, a prerequisite for the use of such a hN(M)C compound in LIBs suitable for (H)EV applications.

It is an object of the present invention to provide a positive electrode active material powder having an improved irreversible capacity (IRRQ) of at most 10.5% obtained by the analysis methods of the present invention, while being sufficiently safe to be used in a lithium-ion secondary battery. The present invention also provide a positive electrode active material powder having an improved first charge capacity of at least 205.5 mAh/g when the atomic ratio of Ni to M' is between 78 at % and 85 at % (e.g. 80 at % for EX1) and at least 212.1 mAh/g when the atomic ratio of Ni to M' is between 85 at % and 90 at % (e.g. 86 at % for EX3):

| Sample ID | According to invention | Coin cell Ni/M' (at %) | DQ1 (mAh/g) | IRRQ (%) | Link to features of claim |
|---|---|---|---|---|---|
| EX1 | Yes | 0.80 | 206.4 | 9.9 | In the claimed range |
| EX2 | Yes | 0.82 | 205.6 | 9.57 | In the claimed range |
| EX3 | Yes | 0.86 | 212.3 | 8.1 | In the claimed range |
| EX4 | Yes | 0.87 | 219.2 | 7.5 | In the claimed range |

SUMMARY OF THE INVENTION

This objective is achieved by providing a positive electrode active material compound according to claim 1, which comprises surface layer having:
  sulfur in a content superior or equal to 0.150 wt % and inferior or equal to 0.375 wt % with respect to the total weight of the positive electrode active material powder, and aluminum in a content superior or equal to 0.05 wt % and inferior or equal to 0.15 wt % with respect to the total weight of the positive electrode active material powder.

Moreover, said surface layer of lithium transition metal-based oxide particles comprises $LiAlO_2$ and $LiM''_{1-a}Al_aO_2$ wherein M'' comprises Ni, Mn, and Co, said $LiAlO_2$ atomic content is superior or equal to 0.10 at % and inferior or equal to 0.30 at % with respect to the total atomic content of M' of the positive electrode active material powder and said $LiM''_{1-a}Al_aO_2$ atomic content being inferior to 0.14 at % with respect to the total atomic content of M' of the positive electrode active material powder.

In the framework of the present invention, ppm means parts-per-million for a unit of concentration, expressing 1 ppm=0.0001 wt %.

The positive electrode active material powder according to the invention has a median particle size D50 ranging from 5 μm to 15 μm and a surface layer thickness ranging from 5 nm to 200 nm, preferably from 10 nm to 200 nm.

It is indeed observed that an improved first discharge capacity of more than 200 mAh/g, as illustrated in the results provided in Table 3 (see below—section G) Results), is achieved with a battery using a positive electrode active material powder according to EX1, having the following features:
- sulfur and aluminum contents in the surface layer of respectively 0.28 wt % and 0.11 wt %, with respect to the total weight of the powder,
- The $LiAlO_2$ phase content is 0.13 at % with respect to the total atomic content of M' of the powder,
- The $LiM''_{1-a}Al_aO_2$ phase content is 0.05 at % with respect to the total atomic content of M' of the powder The particles of EX1 powder have a surface layer with an averaged 100 nm thickness and their size distribution is characterized by a D50 of 11.7 μm.

The present invention concerns the following embodiments:

Embodiment 1

In a first aspect, the present invention concerns a positive electrode active material powder suitable for lithium-ion batteries, comprising lithium transition metal-based oxide particles, said particles comprising a core and a surface layer, said surface layer being on top of said core, said particles comprising the elements:
Li, a metal M' and oxygen, wherein the metal M' has a formula $M'=(Ni_zMn_yCo_x)_{1-k}A_k$, wherein A is a dopant, $0.60 \leq z \leq 0.90$, $0.05 \leq y \leq 0.20$, $0.05 \leq x \leq 0.20$, $x+y+z+k=1$, and $k \leq 0.01$, said positive electrode active material powder having a median particle size D50 ranging from 5 μm to 15 μm, a span ranging from 0.25 to 0.90, and a surface layer thickness ranging from 5 nm to 200 nm, preferably of at least 10 nm and of no more than 200 nm, Preferably, the surface layer has a thickness ranging from 50 nm to 200 nm, more preferably from 100 nm to 200 nm, most preferably from 10 nm to 150 nm.

More preferably, $0.70 \leq z \leq 0.90$.

said surface layer comprising:
- sulfur in a content superior or equal to 0.150 wt % and inferior or equal to 0.375 wt % with respect to the total weight of the positive electrode active material powder, and
- aluminum in a content superior or equal to 0.05 wt % and inferior or equal to 0.15 wt % with respect to the total weight of the positive electrode active material powder, said surface layer of lithium transition metal-based oxide particles comprises a $LiAlO_2$ phase and an $LiM''_{1-a}Al_aO_2$ phase wherein Al partially substitutes M'', M'' comprising Ni, Mn, and Co. The $LiAlO_2$ phase is present in the surface layer in a content superior or equal to 0.10 at % and inferior or equal to 0.30 at % with respect to the total atomic content of M' in the positive electrode active material powder. The $LiM''_{1-a}Al_aO_2$ phase is present in the surface layer in a content inferior to 0.14 at % with respect to the total atomic content of M' in the positive electrode active material powder.

In the framework of the present invention, it must be understood that a phase is associated to a compound. In such a context, it means that at least 19 at % and at most 56 at % of the content of aluminum included in the surface layer is contained in the $LiAlO_2$ phase of said surface layer, and therefore present in said surface layer as an element constituting the $LiAlO_2$ compound.

Also, at most 26 at % of the content of aluminum included in the surface layer is contained in the $LiM''_{1-a}Al_aO_2$ phase of said surface layer, in this phase, the M'' in the $LiM''_{1-a}Al_aO_2$ compound constituting said phase is partially substituted by Al.

The source of A can be fed into the slurry during the co-precipitation step of precursor preparation or can be blended afterwards with the prepared precursor followed by heating. For instance, the source of A can be a nitrate, an oxide, a sulfate, or a carbonate compound, but not limited to these examples. The dopant is generally added to improve the performance of the positive electrode active material such as to support lithium diffusion or suppress the side reaction with electrolyte. The dopant is generally homogeneously distributed in a core. The dopant in a positive electrode active material is identified by a combination of analytical methods such as a combination of an Inductively Coupled Plasma (ICP) method and TEM-EDS (transmission electron microscopy-energy dispersive X-ray spectroscopy) (cfr. Section E).

Preferably, said lithium transition metal-based oxide particles have a monolithic or polycrystalline morphology. A monolithic morphology stands for a morphology of a single particle or of a secondary particle consisting of two or three primary particles, observed in proper microscope techniques like Scanning Electron Microscope (SEM). A powder is referred to as a monolithic powder in case 80% or more of the number of particles in a field of view of: at least 45 μm×at least 60 μm (i.e. of at least 2700 μm²), preferably of: at least 100 μm×at least 100 μm (i.e. of at least 10 000 μm²), provided by SEM have the monolithic morphology. A polycrystalline morphology stands for a morphology of secondary particle consisting of more than three primary particles. Examples of SEM images for particles with monolithic and polycrystalline morphologies are displayed in FIG. 1A and FIG. 1B, respectively.

A positive active material is defined as a material which is electrochemically active in a positive electrode. By active material, it must be understood a material capable to capture and release Li ions when subjected to a voltage change over a predetermined period of time.

Embodiment 2

In a second embodiment, preferably according to the Embodiment 1, said lithium transition metal-based oxide particles have a maximum Al2p peak intensity in the range of binding energies going from 73.0±0.2 eV to 74.5±0.2 eV, preferably from 73.6±0.2 eV to 74.1±0.2 eV, said intensity obtained by XPS spectrum analysis.

A maximum peak intensity of an Al2p peak in the ranges indicates that the major Al form in the surface layer is $LiAlO_2$. A hN(M)C compound having a maximum peak intensity of an Al2p peak in the range from 73.0 eV, preferably from 73.6 eV to 74.5 eV, preferably to 74.1 eV, exhibits a higher specific capacity and better irreversible capacity when used in a battery, as illustrated in Table 3 and Table 5.

Embodiment 3

In a third embodiment, preferably according to the Embodiment 1 or 2, said lithium transition metal-based oxide particles has an Al surface coverage A1/A2 that is superior or equal to 100, wherein A1 is an atomic ratio Al/(Ni+Mn+Co+Al+S) of the elements Al, Ni, Mn, Co, and S contained in the surface layer, said atomic ratio Al being obtained by XPS spectrum analysis and wherein A2 is an atomic ratio Al/(Ni+Mn+Co+Al+S) obtained by ICP.

A1 is obtained by the following method comprising the successive steps of:
1) acquiring an XPS spectrum of the lithium transition metal-based oxide particles;
2) deconvoluting said XPS spectrum so as to identify three distinctive peaks (Al peak1, Al peak2, and Al peak3) having three respective areas (area_1, area_2, area_3), assigned to $LiM''_{1-a}Al_aO_2$ (Al peak1; area_1) $LiAlO_2$ (Al peak2; area_2), and $Al_2O_3$ (Al peak3; area_3) compounds, respectively;
3) calculating the total Al2p peak area value by summing the areas (_1 to _3) of said three distinctives peaks; and
4) converting said value of the Al2p peak area into an atomic ratio A1 (at %/at %)=(Al/(Ni+Mn+Co+Al+S))

The step 4) is obtained according to the following method comprising the successive steps of:
a) fitting the primary XPS peaks of Ni, Mn, Co, and S using Thermo Scientific Avantage software with a Smart background function so as to obtain the peak area of each element;
b) converting the obtained, Ni, Mn, Co, and S peak area from Step 4 a) and Al peak area obtained from step 3) to at % using Thermo Scientific Avantage software and Scofield relative sensitivity library.
c) converting said Al2p at % to A1 by dividing the value of Al at % with the total of Ni, Mn, Co, Al, and S at %.

A value of Al surface coverage A1/A2 of at least 100 indicates that a uniform spatial distribution of Al contained in the surface layer is present. As illustrated in Example 1, A hN(M)C compound having Al distributed uniformly in the surface layer exhibits a higher specific capacity and better irreversible capacity when used in a battery, as demonstrated in Table 3 and Table 5.

Embodiment 4

In a fourth embodiment, preferably according to any of the Embodiments 1 to 3, said surface layer of lithium transition metal-based oxide particles have sulfate ion ($SO_4^{2-}$) in a content superior or equal to 4500 ppm and inferior or equal to 11250 ppm.

The sulfate ion between 4500 ppm and 11250 ppm in the surface layer of lithium transition metal-based oxide particles shows improved electrochemical performance such as high specific capacity and lower irreversible capacity as illustrated in Table 3.

Embodiment 5

In a fifth embodiment, preferably according to any of the Embodiments 1 to 4, said positive electrode active material powder comprises lithium transition metal-based oxide particles having a sulfate ion surface coverage S1/S2 that is superior to 0.85 and inferior or equal to 1.00, wherein S1 is an amount of sulfate ion contained in the surface layer of lithium transition metal-based oxide particles, and wherein S2 is a total amount of sulfate ion in the positive electrode active material powder.

A value of sulfate ion surface coverage S1/S2 of at least 0.85 indicates that a uniform spatial distribution of S contained in the surface layer is present on top of the core. As illustrated in Example 1, a hN(M)C compound having S distributed uniformly in the surface layer exhibits higher specific capacity and better irreversible capacity of the battery as illustrated in Table 3.

Embodiment 6

In a sixth embodiment, preferably according to any of the Embodiments 1 to 5, said positive electrode active material powder according has a carbon content of less than 200 ppm.

Since high carbon content (e.g. superior to 200 ppm) is related to side reactions during cycling when the positive electrode active material powder is in contact with an electrolyte of the battery, a hN(M)C compound with a lower carbon content (e.g. of no more than 200 ppm) leads to improved electrochemical performances such as good irreversible capacity, but limited thereto, when cycled in a battery.

Embodiment 7

In a seventh embodiment, preferably according to any of the preceding Embodiments, the positive electrode active material powder has a general formula: $Li_{1+a'}((Ni_{z'}Mn_{y'}Co_{x'}Al_{v'}S_{w'})_{1-k}A_k)_{1-a'}O_2$, wherein only A is a dopant, wherein: $0.60 \leq z' \leq 0.90$, $0.05 \leq y' \leq 0.20$, $0.05 \leq x' \leq 0.20$, $x'+y'+z'+v+w+k=1$, $0.0018 \leq v \leq 0.0053$, $0.006 \leq w \leq 0.012$, $-0.05 \leq a' \leq 0.05$, and $k \leq 0.01$.

More preferably, $0.70 \leq z' \leq 0.90$.

Embodiment 8

In an $8^{th}$ embodiment, preferably according to any of the preceding Embodiments, A is either one or more of the following elements: Al, B, S, Mg, Zr, Nb, W, Si, Ba, Sr, Ca, Zn, Cr, V, Y, and Ti. In another embodiment, the amount of each of the elements of A is superior to 100 ppm with respect to the total weight of the positive electrode active material powder.

Embodiment 9

In a $9^{th}$ embodiment, preferably according to any of the previous Embodiments, the (minimum) thickness of the surface layer is defined as the shortest distance between a first point located at a periphery of a cross-section of a particle and a second point located in a line defined between said first point and a geometric center (or centroid) of said particle, wherein the content of S measured by TEM-EDS (cfr. section E) at the second point location (S2) and at any location between said second point location and the center of the particle is 0 at %±0.1 at %.

The content of S at the second point location ($S_2$) is constant: it can be superior to 0 at % and must be inferior or equal to 5.0% of a first content of S at the first point location ($S_1$) said second content of S2 being equal to a content of S at a third point location ($S_3$) in said line, said third point being located at any location between the geometric center of said particle and the second point location.

In other words, the thickness of the surface layer corresponds to a minimal distance D defined either as:

$$D(\text{in nm}) = L_{S1} - L_{S2},$$

wherein $L_{S1}$ is a first point location at the periphery of a particle, $L_{S2}$ is a second point location in a line defined between said first point location and a geometric center of said particle as illustrated in FIG. 2,
wherein a second content of S is measured by TEM-EDS at the second point location $L_{S2}$ is superior or equal to 0 at % and inferior to a first content of S ($S_1$) measured at the first point location, said second content of S ($S_2$) being defined as:

$$S_2(\text{in at \%}) = S_3 \pm 0.1 \text{ at \%, and optionally}$$

$$S_1 - S_2 \geq 10.0 \text{ at \%}$$

$S_3$ being a third content of S (in at %) at a third point location ($LS_3$) in said line, said third point being located at any location between the geometric center of said particle and the second point location $L_{S2}$.

When $S_2$ and $S_3$ are superior to 0.0 at %, the second and third content of S corresponds to the content of S, measured by TEM-EDS, present as a dopant in the core of the particles according to the invention.

The TEM-EDS protocol is applied as follows:
1) A cross-sectional TEM lamella of the lithium transition metal-based oxide particles is extracted by cutting the particle sample using a Ga ion beam so as to obtain a prepared sample.
2) The prepared sample (a cross section of particle) is scanned with a TEM/EDS line scan from the external edge of the surface layer to the center of a lithium transition metal-based oxide particle, so as to provide a quantitative element analysis of the cross-section.
3) The Al and S content detected by EDS are normalized by M* where M* is the total atomic of Ni, Mn, Co, Al, and S in the scanned lamella.
4) The measured line scan of Al/M* and S/M* is then plotted as a function of a linear distance in a cross section of said particle.

The aforementioned steps 1) to 4) are repeated as many time as there are particles to be analyzed.

The aforementioned TEM-EDS measurement is performed on at least one particle. When more than one particle are measured, the Al/M* and S/M* are numerically averaged.

Embodiment 11

In an 11$^{th}$ embodiment, preferably according to Embodiment 10, Al is present in the surface layer in a content 1 defined as:

$$l(\text{mol \%}) = \left(\frac{Al}{M^*}\right)_{ICP} \times (Al_{surface}/Al_{total}),$$

with:

$$\left(\frac{Al}{M^*}\right)_{ICP}$$

is the atomic ratio of Al content on M* content in the powder measured by ICP, wherein M* is a total atomic content of Ni, Mn, Co, Al and S and $$Al_{surface}/Al_{total} = \frac{\frac{4}{3}\pi(Area2)^3 - \frac{4}{3}\pi(Area2 - Area1)^3}{\frac{4}{3}\pi(Area2)^3} \times 100,$$

wherein:
$Al_{surface}$ is the content of Al in at % in the surface layer measured by EDS;
$Al_{total}$ the total content of Al in at % in the particles of said powder measured by EDS;
Area1 is the integral of the Al/M* content measured by cross-section-TEM-EDS over D:

$$Area1 \; (\text{at \%/at \%}) = \int_{x=0}^{x=D} \frac{Al}{M^*}(x),$$

where:
Al(x) is the atomic content of Al at a point x of a cross sectional particle measured by cross-section-TEM EDS,
M*(x) is the atomic content of Ni, Mn, Co, Al, and S, at a point x of a cross sectional particle measured by cross-section-TEM EDS, and
x is the distance expressed in nm measured by TEM between said first and second point locations.
Area2 is the integral of the Al/M* content measured by cross-SEM EDS over a distance C:

$$Area2 \; (\text{at \%/at \%}) = \int_{x=0}^{x=C} \frac{Al}{M^*}(x),$$

where:
Al(x) is the atomic content of Al at a point x of a cross sectional particle measured by cross-section-TEM EDS,
M*(x) is the atomic content of Ni, Mn, Co, Al, and S, at a point x of a cross sectional particle measured by cross-section-TEM EDS, and
x is the distance expressed in nm and measured by TEM between said first point location (at x=0 nm) and the geometric center of said particle (at x=C), wherein C preferably ranges from 2.5 μm to 7.5 μm.

All the above-provided Embodiments 1 to 11 are combinable.

The present invention concerns a use of the positive electrode active material powder according to any of the preceding Embodiments 1 to 11 in a battery.

The present invention is also inclusive of a process for manufacturing the positive electrode active material powder according to any of the preceding Embodiments 1 to 11, comprising the steps of:
Preparing a lithium transition metal-based oxide compound, mixing said lithium transition metal-based oxide compound with a source of sulfate ion, preferably with $Al_2(SO_4)_3$, and with water, thereby obtaining a mixture, and heating the mixture in an oxidizing atmosphere in a furnace at a temperature between 350° C. and less than 500° C., preferably at most 450° C., for a time between 1 hour and 10 hours so as to obtain the positive electrode active material powder according to the present invention.

DETAILED DESCRIPTION

Figure 1A:
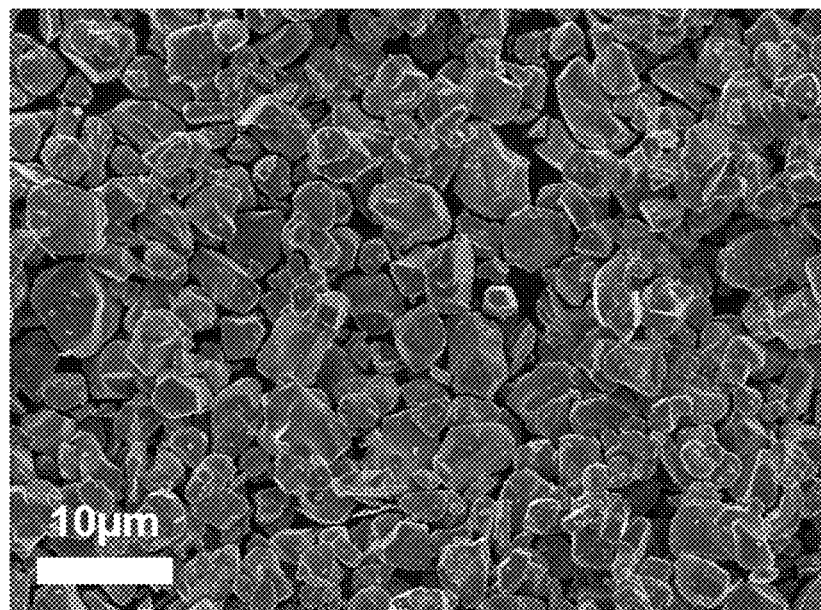
FIG. 1A. SEM image of particles with monolithic morphology
Figure 1B:
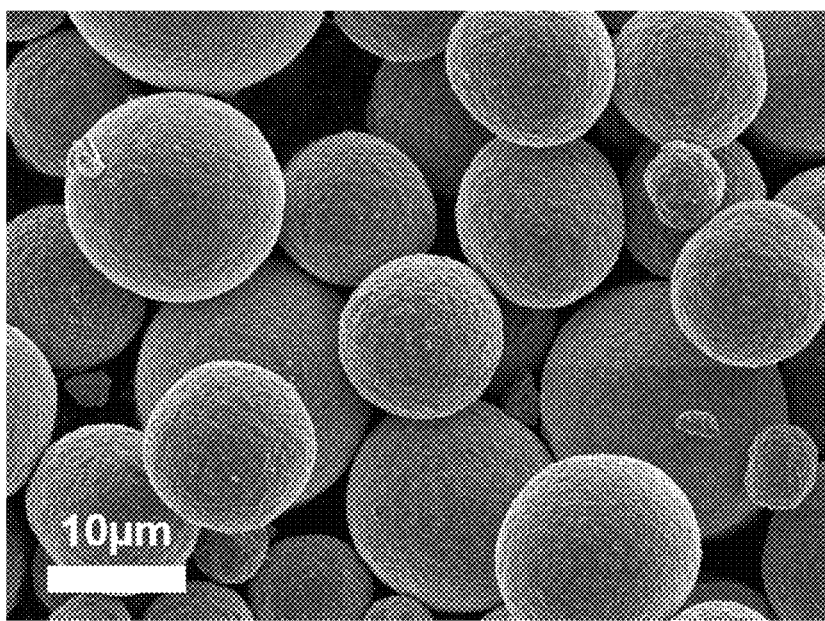
FIG. 1B. SEM image of particles with polycrystalline morphology
Figure 2:
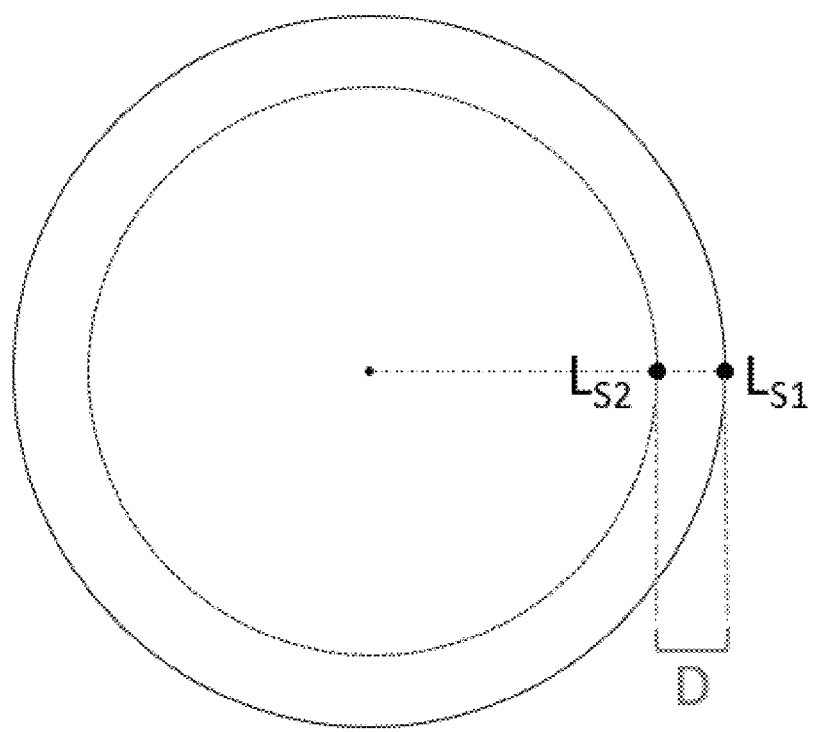
FIG. 2. Schematic image of the positive electrode active material particle cross section wherein $L_{S1}$ is the first point location at the periphery of the particle, $L_{S2}$ is the second point location at the imaginary line between the geometric center of said particle and the $L_{S1}$. D is the thickness of the surface layer defined as the distance between $L_{S1}$ and $L_{S2}$ (cfr. Embodiment 10).

In the drawings and the following detailed description, preferred embodiments are described so as to enable the practice of the invention. Although the invention is described with reference to these specific preferred embodiments, it will be understood that the invention is not limited to these preferred embodiments. The invention includes numerous alternatives, modifications and equivalents that are apparent from consideration of the following detailed description and accompanying drawings.

A) ICP Analysis

The Li, Ni, Mn, Co, Al, and S contents of the positive electrode active material powder are measured with the Inductively Coupled Plasma (ICP) method by using an Agillent ICP 720-ES. 2 g of product powder sample is dissolved into 10 mL of high purity hydrochloric acid in an Erlenmeyer flask. The flask is covered by a glass and heated on a hot plate at 380° C. until complete dissolution of the precursor. After being cooled to room temperature, the solution of the Erlenmeyer flask is poured into a 250 mL volumetric flask. Afterwards, the volumetric flask is filled with deionized water up to the 250 mL mark, followed by complete homogenization. An appropriate amount of solution is taken out by pipette and transferred into a 250 mL volumetric flask for the $2^{nd}$ dilution, where the volumetric flask is filled with internal standard and 10% hydrochloric acid up to the 250 mL mark and then homogenized. Finally, this 50 mL solution is used for ICP measurement. The atomic ratio of Al to the total amount of Ni, Mn, Co, Al, and S (Al/(Ni+Mn+Co+Al+S) (at %)) is named A2.

The amount of sulfate ion ($SO_4^{2-}$) in the entire powder, which is named S2, is obtained by the below equation:

$$\text{Sulfate ion (ppm)} = S \text{ (wt \%)} \times \frac{MW_{SO4}}{MW_S} \times \frac{10000 \text{ ppm}}{1 \text{ wt \%}}$$

$MW_{SO4}/MW_S$, molecular weight of $SO_4$ divided by molecular weight of elemental S, is 2.996 value.

To investigate the S content in the surface of lithium transition metal-based oxide particles according to the invention, washing and filtering processes are performed. 5 g of the positive electrode active material powder and 100 g of ultrapure water are measured out in a beaker. The electrode active material powder is dispersed in the water for 5 minutes at 25° C. using a magnetic stirrer. The dispersion is vacuum filtered, and the filtered solution is analyzed by the above ICP measurement to determine the amount of S present in the surface layer. The amount of the remaining S in the washed powder after the washing and filtering processes is defined as a dopant and the amount of the removed S from the washed powder after the washing and filtering processes is defined as the amount of S present in the surface layer. The amount of sulfate ion ($SO_4^{2-}$) in the particle surface layer is obtained by multiplying the amount of S from this analysis by 2.996 and 10000 ppm, which is named S1. A sulfate ion surface coverage, S1/S2, is calculated by dividing S1 by S2.

B) X-Ray Photoelectron Spectroscopy Analysis

In the present invention, X-ray photoelectron spectroscopy (XPS) is used to identify and to determine the content (in at %) of each of the Al-based compounds or phases present in the surface layer of the cathode material particles according to the invention.

Such an identification includes to perform: i) a fitting of Al2p peaks identified by XPS (cfr. section B2—XPS peak treatment) followed by ii) a quantitative phase analysis by calculating the content in the surface layer of each of the compounds identified by the fitting of the Al2p peaks (cfr. section B3—content of Al-based compounds).

Also, XPS is used in the framework of the present invention to measure an Al surface coverage value which indicates the degree of homogeneity of said Al distribution in the surface layer of the particles according to the present invention.

The below-provided procedure is applicable to any cathode material according to the present invention and to the comparative examples described herein.

B1) XPS Measurement Conditions

For the surface analysis of lithium transition metal-based oxide particles, XPS measurement is carried out using a Thermo K-α+(Thermo Scientific) spectrometer. Monochromatic Al Kα radiation (hu=1486.6 eV) is used with a spot size of 400 µm and measurement angle of 45°. Wide survey scan to identify elements present at the surface is conducted at 200 eV pass energy. C1s peak having a maximum intensity (or centered) at 284.8 eV is used as a calibrate peak position after data collection. Accurate narrow-scans are performed afterwards at 50 eV for at least 10 scans for each identified element to determine the precise surface composition.

B2) XPS Peak Treatment

In XPS measurements, the signal is acquired from the first few nanometers (e.g. 1 nm to 10 nm) of the sample surface layer. Therefore, all elements measured by XPS are contained in the surface layer. It is therefore assumed that the surface layer has a homogeneous distribution of the identified phases.

The quantitative phase analysis of XPS raw data is based on the treatment of XPS signals leading to a deconvolution of XPS peaks and to the determination of the contributions of the existing Al-based compounds to the deconvoluted peaks.

The XPS peak deconvolution is conducted to obtain the different contributions of atomic Al-based compounds including $LiM''_{1-a}Al_aO_2$, $LiAlO_2$, and $Al_2O_3$ in the surface layer of the investigated positive electrode active material particles. $Al_2O_3$ compound results from the heating of $Al_2(SO_4)_3$ that has not reacted with the lithium of the first sintered lithium transition metal-based oxide compound.

The XPS peaks measured for the positive electrode active material powder according to the invention are essentially a combination of multiple sub-peaks located within a narrow range of binding energies. An Al2p peak having a maximum intensity appearing (or centered) at a range of binding energies going from 70 eV to 79 eV consists of contributions from different sub-peaks of different Al containing compounds. The location (position of the maximum intensity) of each sub-peak is different from each other.

The XPS signal treatment including XPS peak deconvolution process in this invention follows the steps provided hereunder:

Step 1) removal of background by a linear function,
Step 2) deciding an equation of a fitting model,
Step 3) deciding the constraints of variables in the equation of a fitting model,
Step 4) deciding the initial values of variables before a calculation,
Step 5) executing the calculation Step 1) Removal of Background by a Linear Function In this invention, the XPS signal treatment is performed using a spectrum of an Al2p narrow scan in the range from 65±0.5 eV to 85±0.5 eV, wherein the spectrum comprises an Al2p peak having a maximum intensity (or being centered) in a range from 70 eV to 85 eV and overlaps with Ni3p peaks, each of these peaks having a maximum intensity (or being centered) in a range from 65 eV to 71 eV. The background of the measured data point is linearly baselined at the range from 65.0±0.5 eV to 81.5±0.5 eV.

Step 2) Deciding an Equation of a Fitting Model

There are four sub-peaks of a Ni3p peak and three sub-peaks of an Al2p peak having a maximum intensity in the range from 65.0±0.5 eV to 81.5±0.5 eV. The peaks are labelled as Ni3p1, Ni3p1 satellite, Ni3p2, Ni3p2 satellite, Al peak1, Al peak2, and Al peak3. The satellite peak is a minor additional peak appearing at a few eV higher binding energy than its primary peak. It is associated with the unfiltered X-Ray source from anode material in the XPS instrument. Al peaks 1 to 3 correspond to the compounds present in the particle surface layer, each are related to the: i) $LiM''_{1-a}Al_aO_2$, ii) $LiAlO_2$, and iii) $Al_2O_3$ phases, respectively.

Table 1.1 shows the reference of the maximum peak intensity position range for the $LiM''_{1-a}Al_aO_2$, $LiAlO_2$, and $Al_2O_3$ phases. The range of binding energy of Al peak1 varies with the amount of Al doped in the structure.

TABLE 1.1

XPS peak reference

| Peak | Binding Energy range (eV) | Compound attributed | Literature reference |
|---|---|---|---|
| Al peak1 | 72.6-73.1 | $LiM''_{1-a}Al_aO_2$ | Chem. Mater. Vol. 19, No. 23, 5748-5757, 2007; |
| Al peak2 | 73.5-73.9 | $LiAlO_2$ | J. Electrochem. Soc., 154 (12) A1088-1099, 2007; and Chem. Mater. Vol. 21, No. 23, 5607-5616, 2009. |
| Al peak3 | 73.9-74.3 | $Al_2O_3$ | Moulder, J. F., Handbook of XPS, Perkin-Elmer, 1992 |

The equation of a fitting model is according to the pseudo-Voigt equation which is a combination of Gaussian and Lorentzian functions commonly used for XPS peak fitting. The equation is:

$$y = y_o + A'\left[m_u \frac{2}{\pi} \frac{w}{4(x-x_c)^2 + w^2} + (1-m_u)\frac{\sqrt{4\ln 2}}{\sqrt{\pi} w} e^{\frac{4\ln 2}{w^2}(x-x_c)^2}\right]$$

with $y_o$=an offset, $x_c$=a center position of the sub-peak, A'=an area of the sub-peak, w=a width of sub-peaks (full width at half maximum or FWHM), and $m_u$=a profile shape factor.

Step 3) Deciding the Constraints of Variables in the Equation of a Fitting Model The constraints of five variables ($y_0$, $x_c$, A', w, $m_u$) are described below:

$y_0$ (offset):
  $y_0$ of all 7 sub-peaks are 0.
$x_c$ (a center position of the sub-peak):
  $X_c$ of Ni3p1≥66.0 eV;
  $X_c$ of Ni3p1≤$X_c$ of Ni3p1 satellite−0.7 eV;
  $X_c$ of Ni3p1 satellite≤$X_c$ of Ni3p2−0.7 eV;
  $X_c$ of Ni3p2≤72 eV
  $X_c$ of Ni3p2≤$X_c$ of Ni3p2 satellite−0.7 eV;
  72.3 eV≤$X_c$ of Al peak1≤73.3 eV;
  73.5 eV≤$X_c$ of Al peak2≤73.9 eV; and
  73.9 eV≤$X_c$ of Al peak3≤74.3 eV.

The ranges of $X_c$ for Al peaks 1 to 3 are determined from Chem. Mater. Vol. 19, No. 23, 5748-5757, 2007; J. Electrochem. Soc., 154 (12) A1088-1099, 2007; and Chem. Mater. Vol. 21, No. 23, 5607-5616, 2009.

A' (area of sub-peaks):
  A' of Ni3p1*0.1≤A' of Ni3p1 satellite*1.2≤A' of Ni3p1;
  A' of Ni3p2*0.1≤A' of Ni3p2 satellite; and
  A' of all 7 sub-peak are superior to 1.0.
w (width of sub-peaks):
  1.2≤w≤1.8
$M_u$ (profile shape factor):
  0.1≤$m_u$≤0.9

Step 4) Deciding the Initial Values of Variables Before a Calculation

A calculation for fitting sub-peaks is reproducible when the initial values of variables are obtained by the following procedure:

1) The initial values of $y_0$, w, $m_u$ are respectively set to 0.0, 1.5, and 0.7.
2) The initial values of $x_c$ of the sub-peaks Ni3p1, Ni3p1 satellite, Ni3p2, Ni3p2 satellite, Al peak1, Al peak2, and Al peak3 are 67.0 eV, 68.0 eV, 69.0 eV, 70.0 eV, 73.0 eV, 73.7 eV, and 74.3 eV, respectively.

3) The initial values of A' of the sub-peaks Ni3p1, Ni3p1 satellite, Ni3p2, and Ni3p2 satellite are obtained by the following additional procedure:
   3.a) The A' of the sub-peak of Ni3p1 is a maximum peak intensity of a Ni3p peak multiplied by a 1.5 factor, wherein the shape of the peak is estimated as a triangle having a base of 3 eV.
   3.b) The A' of the sub-peak of Ni3p2 is 60% of that of Ni3p1.
   3.c) The A' of the sub-peak of Ni3p1 satellite is 80% of that of Ni3p1.
   3.d) The A' of the sub-peak of Ni3p2 satellite is 80% of that of Ni3p2.

4) The initial values of A' of the sub-peaks Al peak1, Al peak2, and Al peak3 are obtained by the following procedure:

4.a) A' values of the three sub-peaks of Al2p are calculated according to the following equation:

A'=Fraction Factor (FF)×Estimated Area×Normalization Factor (NF)

A fraction Factor (FF) is a function of xc of three sub-peaks of Al2p in the range from $x_o$ to $x_n$ where $x_o$=72.8 eV and $x_n$=74.6 eV. The intensity of Al peak1 linearly decreases from $x_n$ to $x_o$.

4.b) The intensity of Al peak3 linearly increases from $x_n$ to $x_o$. The intensity of Al peak2, which is located between Al peak1 and Al peak3, has therefore the highest intensity at its center 73.7 eV. The Fraction Factor (FF) for each sub-peak is calculated according to the below equations:

$$FF \text{ of Al } peak1 = \frac{x_n - x_c}{x_n - x_o};$$

$$FF \text{ of Al } peak2 = -4 \times \left(\left(\frac{x_n - x_c}{x_n - x_o}\right) - 0.5\right)^2;$$

and $$FF \text{ of Al } peak3 = x_n - \left(\frac{x_n - x_c}{x_n - x_o}\right).$$

The estimated area is a maximum peak intensity of an Al2p peak*2.5, wherein the shape of the peak is estimated as a triangle having a base of 5 eV.

4.c) A Normalization Factor (NF) is added to subtract the overlapping area from the total calculated peak when the sub-peaks are summed. It is important because the first two components in the peak area (A') equation (Fraction Factor and Estimated Area) include some overlapped regions which render the calculated intensity excessively high. In the calculation method, sub-peaks are simplified so as to be considered like a triangle shape with a height t and a base b.

The locations of a maximum intensity are xc for Al peak1, Al peak2, and Al peak3 which are 73.0V, 73.7 eV, and 74.3 eV for, respectively. All sub-peaks are assumed to have the same size and shape with base is set to be 3 eV. Normalization factor for each sub-peak is calculated as:

$$NF \text{ of Al } peak1 = $$

$$\frac{\text{Al } peak1}{\text{overlapped Al } peak1} = \frac{\left(\frac{1}{2} \cdot 3 \cdot t\right)}{\left(\frac{1}{2} \cdot 3 \cdot t\right) + \left(\frac{1}{2} \cdot 2.3 \cdot \frac{23}{30} t\right)} = 0.57;$$

$$NF \text{ of Al } peak2 = \frac{\text{Al } peak2}{\text{overlapped Al } peak2} = $$

$$\frac{\left(\frac{1}{2} \cdot 3 \cdot t\right)}{\left(\frac{1}{2} \cdot 3 \cdot t\right) + \left(\frac{1}{2} \cdot 2.3 \cdot \frac{23}{30} t\right) + \left(\frac{1}{2} \cdot 2.4 \cdot \frac{24}{30} t\right) + \left(\frac{1}{2} \cdot 1.7 \cdot \frac{17}{30} t\right)} = 0.39; \text{ and}$$

$$NF \text{ of Al } peak3 = \frac{\text{Al } peak3}{\text{overlapped Al } peak3} = $$

$$\frac{\left(\frac{1}{2} \cdot 3 \cdot t\right)}{\left(\frac{1}{2} \cdot 3 \cdot t\right) + \left(\frac{1}{2} \cdot 2.4 \cdot \frac{24}{30} t\right) + \left(\frac{1}{2} \cdot 1.7 \cdot \frac{17}{30} t\right)} = 0.51.$$

Table 1.2 shows the example of initial values of variables for EX1.

TABLE 1.2

Example of initial values of variables for EX1

| Parameters | Ni3p1 | Ni3p1 satellite | Ni3p2 | Ni3p2 satellite | Al peak1 | Al peak2 | Al peak3 |
|---|---|---|---|---|---|---|---|
| $y_0$ | 0 | 0 | 0 | 0 | 0 | 0 | 0 |
| $x_c$ | 67 | 68 | 69 | 70 | 73 | 73.7 | 74.3 |
| A' | 2773.1 | 2218.5 | 1663.8 | 1331.1 | 1404.6 | 3889.6 | 6895.2 |
| w | 1.5 | 1.5 | 1.5 | 1.5 | 1.5 | 1.5 | 1.5 |
| $m_u$ | 0.7 | 0.7 | 0.7 | 0.7 | 0.7 | 0.7 | 0.7 |

Step 5) Executing the Calculation

The peak deconvolution process is assisted by a Solver tool, embedded in the Microsoft Excel software Version 1808. The minimum value of a target cell is set as the objective of the Solver calculation. The target cell returns the sum of squares of differences between a measured curve and a calculated curve. The calculation is terminated when the correlation coefficient between a measured curve and a calculated curve reaches 99.5% or more. When the number is closer to 100% it shows the shape of a calculated curve is closely matched with the shape of a measured curve. Otherwise, iterations will continue to reach the minimum value of the objective.

Figure 3A:
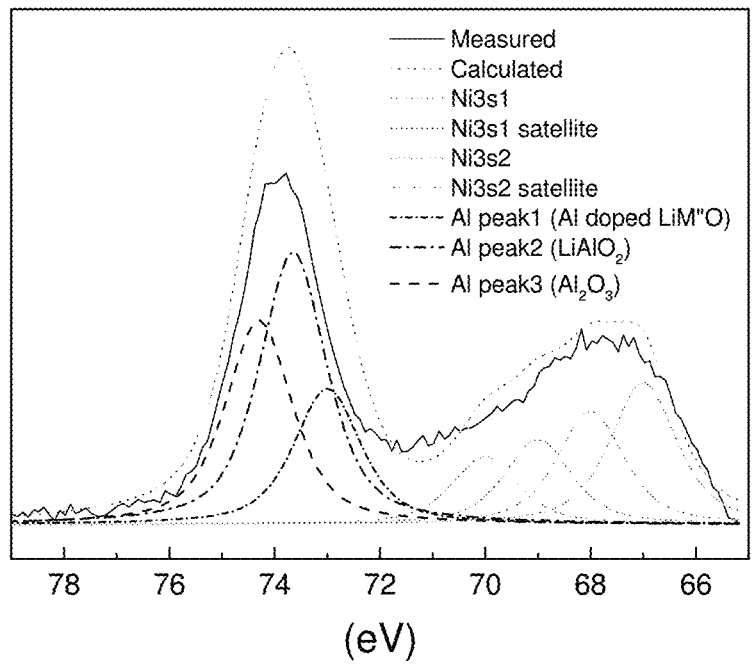
FIG. 3A. XPS Al peak deconvolution of CEX1.2 before fitting process (x-axis: binding energy, y-axis: count)
Figure 3B:
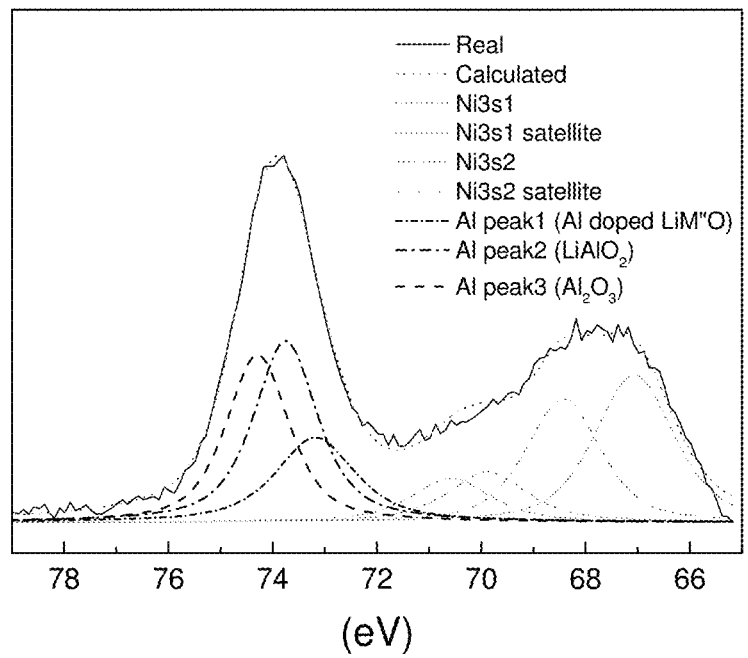
FIG. 3B. XPS Al peak deconvolution of CEX1.2 after fitting process (x-axis: binding energy, y-axis: count)

An Al2p peak of EX1 before and after fitting process is shown in FIG. 3A (x-axis: binding energy, y-axis: count) and FIG. 3B (x-axis: binding energy, y-axis: count), respectively. The result of calculated variables is shown in Table 1.3.

TABLE 1.3

Calculated parameter after fitting for EX1

| Parameter | Ni3p1 | Ni3p1 satellite | Ni3p2 | Ni3p2 satellite | Al peak1 | Al peak2 | Al peak3 |
|---|---|---|---|---|---|---|---|
| $y_0$ | 0 | 0 | 0 | 0 | 0 | 0 | 0 |
| $x_c$ | 67.0 | 68.1 | 68.8 | 70.4 | 73.3 | 73.5 | 74.1 |
| A' | 2010.8 | 1534.0 | 1814.1 | 1407.0 | 1431.9 | 3705.7 | 5091.1 |
| w | 1.8 | 1.7 | 1.8 | 1.8 | 1.8 | 1.4 | 1.4 |
| $m_u$ | 0.6 | 0.6 | 0.8 | 0.8 | 0.8 | 0.8 | 0.7 |

B3) Content of Al-Based Compounds Linked to Identified Al Sub-Peaks 1 to 3

The ratio of A' (area) of each Al sub-peak is directly converted to the relative atomic ratio among corresponding Al compounds in a surface layer by dividing the area of each Al sub-peak by the sum of areas of all three Al sub-peaks. The amount of LiM"$_{1-a}$Al$_a$O$_2$, LiAlO$_2$, and Al$_2$O$_3$ is then provided with respect to the total atomic content of M' in the positive electrode active material powder.

For example, the relative atomic ratio of Al peak1 (LiM'$_{1-a}$Al$_a$O$_2$): Al peak2 (LiAlO$_2$): Al peak3 (Al$_2$O$_3$) is 14.0 at %:36.2 at %:49.8 at % in the surface layer of EX1 based on Table 1.2. Since the total content of aluminum is contained in the surface layer of EX1 and is obtained by ICP analysis, the amount of LiM"$_{1-a}$Al$_a$O$_2$, LiAlO$_2$, and Al$_2$O$_3$ with respect to the total atomic content of M' of the positive electrode active material powder is obtained by multiplying the atomic percentage of Al/M' in the positive electrode active material powder (measured by ICP) and the relative atomic ratio of each Al sub-peaks (measured by XPS). For example, the amount of LiAlO$_2$ in EX1 is 0.367 (at %) (Al/M')*36.2% (LiAlO$_2$/(LiM"$_{1-a}$Al$_a$O$_2$+LiAlO$_2$+Al$_2$O$_3$)=0.13 at %.

B4) XPS Peak Integration and Coverage

All primary peaks for other elements except Al2p are fitted using the Thermo Scientific Avantage software with a Smart background function. The Smart background is a Shirley-type baseline with the constraint that background intensity must be lower than the data point intensity. An Al2p peak integrated area is calculated as the sum of areas of Al peak1, Al peak2, and Al peak3 in B2) XPS deconvolution process. Scofield relative sensitivity library is used for the calculation of atomic fractions from the integrated peak area. The atomic ratio of Al to the total amount of Ni, Mn, Co, Al, and S (Al/(Ni+Mn+Co+Al+S) (at %/at %) is named A1.

The Al surface coverage value is calculated as the fraction of Al on the surface of particle (A1), measured by XPS, divided by the Al fraction in the particle (A2), measured by ICP. The surface coverage of the positive electrode active material by Al is calculated as follow:

$$\text{Al surface coverage} = \frac{Al/M^*(XPS)}{Al/M^*(ICP)} = \frac{A1}{A2}$$

Where M* is the total atomic fraction of Ni, Mn, Co, Al, and S of the positive electrode active material particles.

The surface coverage by Al indicates the degree of coverage of the positive active electrode active material particles by aluminum. If the Al surface coverage value is high, the Al compound covers the surface with a homogenous distribution.

C) Carbon Measurement

The content of carbon of the positive electrode active material powder is measured by Horiba EMIA-320V carbon/sulfur analyzer. 1 g of hNMC powder is placed in a ceramic crucible in a high frequency induction furnace. 1.5 g of tungsten and 0.3 g of tin as accelerators are added into the crucible. The powder is heated at a programmable temperature. Gases produced during the combustion are then analyzed by four Infrared detectors. The analysis of low and high $CO_2$ and CO determines carbon concentration.

D) PSD Measurement

A particle-size distribution (PSD) is measured using a Malvern Mastersizer 3000 with Hydro MV wet dispersion accessory after dispersing the powder in an aqueous medium. In order to improve the dispersion of the powder, sufficient ultrasonic irradiation and stirring is applied, and an appropriate surfactant is introduced. D10, D50, and D90 are defined as the particle size at 10%, 50%, and 90% of the cumulative volume % distribution. A span is defined as: span=(D90−D10)/D50.

E) TEM-EDS Measurement

To examine the Al and S distributions within a lithium transition metal-based oxide particle, cross-sectional TEM lamellas of particles are prepared by a Helios Nanolab 450 hp Dual Beam Scanning Electron Microscope-Focused Ion Beam (SEM-FIB) (FEI, USA, https://www.nanolabtechnologies.com/helios-nanolab-450-fei/). A Ga ion beam is used with 30 kV voltage and 30 pA-7 nA current. The obtained etched sample has a dimension of 5×8 μm with 100 nm thickness. Using the prepared (etched) sample, the surface property from the top to the center of the lithium transition metal-based oxide particle is analyzed by TEM and energy-dispersive X-ray spectroscopy (EDS). The TEM-EDS line scan is performed on a JEM-2100F (JEOL, https://www.jeol.co.jp/en/products/detail/JEM-2100F.html) with X-Max$^N$ 80T (Oxford instruments, https://nano.oxinst.com/products/x-max/x-max). An EDS analysis of the lithium transition metal-based oxide particle provides the quantitative element analysis of the cross-section. The Al and S are normalized by M* where M* is the total atomic fraction of Ni, Mn, Co, Al, and S.

The measured line scan of Al/M* and S/M* as a function of a linear distance in a cross section of particle is smoothed by Savitzhky-Goslay filter with the points of 20 using Origin 9.1 software so as to mitigate intrinsic analytical error of EDS.

F) Coin Cell Testing

F1) Coin Cell Preparation

For the preparation of a positive electrode, a slurry that contains a positive electrode active material powder, conductor (Super P, Timcal), binder (KF #9305, Kureha)—with a formulation of 90:5:5 by weight—in a solvent (NMP, Mitsubishi) is prepared by a high-speed homogenizer. The homogenized slurry is spread on one side of an aluminum foil using a doctor blade coater with a 230 μm gap. The slurry coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between a positive electrode and a piece of lithium foil used as a negative electrode. 1M LiPF$_6$ in EC/DMC (1:2) is used as electrolyte and is dropped between separator and electrodes. Then, the coin cell is completely sealed to prevent leakage of the electrolyte.

F2) Testing Method

The testing method is a conventional "constant cut-off voltage" test. The conventional coin cell test in the present invention follows the schedule shown in Table 2. Each cell is cycled at 25° C. using a Toscat-3100 computer-controlled galvanostatic cycling station (from Toyo). The schedule uses a 1C current definition of 220 mA/g. The initial charge capacity (CQ1) and discharge capacity (DQ1) are measured in constant current mode (CC) at C rate of 0.1C in the 4.3V to 3.0V/Li metal window range.

The irreversible capacity IRRQ is expressed in % as follows:

$$IRRQ\ (\%) = \frac{(CQ1 - DQ1)}{CQ1} \times 100$$

TABLE 2

Cycling schedule for Coin cell testing method

| | Charge | | | | Discharge | | |
|---|---|---|---|---|---|---|---|
| C Rate | End current | Rest (min) | V/Li metal (V) | C Rate | End current | Rest (min) | V/Li metal (V) |
| 0.1 | — | 30 | 4.3 | 0.1 | — | 30 | 3.0 |

G) Results

The invention is further illustrated by the following (non-limitative) examples:

Example 1

A polycrystalline hNMC product (CEX1.1), having the formula Li$_{1+a}$(Ni$_{0.80}$Mn$_{0.10}$Co$_{0.10}$)$_{1-a}$O$_2$ and a span of 1.24 is obtained through a double sintering process which is a solid-state reaction between a lithium source and a transition metal-based source running as follows:

1) Co-precipitation: a transition metal-based hydroxide precursor M'O$_{0.24}$(OH)$_{1.76}$ with metal composition M'=Ni$_{0.80}$Mn$_{0.10}$Co$_{0.10}$ is prepared by a co-precipitation process in a large-scale continuous stirred tank reactor (CSTR) with mixed nickel-manganese-cobalt sulfates, sodium hydroxide, and ammonia. The transition metal-based hydroxide precursor has a D50 of 12.0 µm and a span of 1.24.

2) Blending: the transition metal-based hydroxide and LiOH as a lithium source are homogenously blended at a lithium to metal M' (Li/M') ratio of 1.01 in an industrial blending equipment.

3) 1$^{st}$ sintering: the blend is sintered at 730° C. for 12 hours under an oxygen atmosphere. The sintered powder is crushed, classified, and sieved so as to obtain a sintered intermediate product.

4) 2$^{nd}$ sintering: the intermediate product is sintered at 830° C. for 12 hours under an oxygen atmosphere so as to obtain a sintered powder of agglomerated primary particles. The sintered powder is crushed, classified, and sieved so as to obtain CEX1.1 having a formula Li$_{1.005}$M'$_{0.995}$O$_2$ (a=0.005) with M'=Ni$_{0.80}$Mn$_{0.10}$Co$_{0.10}$. CEX1.1 has a D50 of 12.0 µm and a span of 1.24. CEX1.1 comprises a trace of sulfur obtained from the metal sulfate sources in the Step 1) co-precipitation process.

Optionally, a source of dopant can be added in the co-precipitation process in Step 1) or in the blending step in the Step 2) together with lithium source. Dopant can be added, for instance, to improve the electrochemical properties of the positive electrode active material powder product.

CEX1.1 is not according to the present invention.

CEX1.2, which is not according to the present invention, is prepared by the following procedure. 1 kg of CEX1.1 is blended with an aluminum and sulfate ion solution, which is prepared by dissolving 11.68 g Al$_2$(SO$_4$)$_3$.16H$_2$O into 29.66 mL deionized water. The prepared blend is heated at 375° C. for 8 hours under an oxygen atmosphere. After heating, the powder is crushed, classified, and sieved so as to obtain CEX1.2. Accordingly, the hNMC compound, CEX1.2, contains about 1000 ppm Al with respect to the total weight of CEX1.2. The preparation of CEX1.2 from CEX1.1 is also called, in the framework of the present invention, a surface treatment.

A polycrystalline hNMC product (CEX1.3), having the formula Li$_{1+a}$(Ni$_{0.80}$Mn$_{0.10}$Co$_{0.10}$)$_{1-a}$O$_2$ and a span of 0.65 is obtained through a double sintering process which is a solid-state reaction between a lithium source and a transition metal-based source running as follows: 1) Co-precipitation: a transition metal-based hydroxide precursor M'O$_{0.24}$(OH)$_{1.76}$ with metal composition M'=Ni$_{0.80}$Mn$_{0.10}$Co$_{0.10}$ is prepared by a co-precipitation process in continuous stirred tank reactor (CSTR) with a manual back-feeding process. The temperature of the CSTR is fixed at 60° C. A 2M M'SO$_4$ solution (M'=Ni$_{0.80}$Mn$_{0.10}$Co$_{0.10}$), 10M NaOH solution, and 12M NH$_4$OH solution with a flow rate of 2 L/hour, 0.9 L/hour, and 0.4 L/hour respectively, are continuously fed into a 10 L reactor with a residence time of 3 hours. The CSTR is continuously stirred through an impeller at 1000 rpm. The precursor slurry is collected through an overflow at each hour. The collected precursor slurry is settled down and 2.8 L of clear mother-liquor is dumped. The remaining 0.5 L thick slurry is manually back-fed into the CSTR at each hour. During this procedure, the PSD of the precursor inside the CSTR is measured. When the D50-particle size of the precursor reaches 11 µm, each time 5 L of precursor slurry is collected. The collected precursor slurry is filtered and washed by de-ionized water, and then dried at 150° C. for 20 hours under N$_2$ atmosphere, obtaining the transition metal-based hydroxide precursor having a D50 of 11.7 µm and a span of 0.65.

2) Pre-heating: the transition metal-based hydroxide precursor is pre-heated at 365° C. for 10 hours in air so as to obtain a transition metal-based oxide precursor.

3) Blending: the transition metal-based oxide and LiOH as a lithium source are homogenously blended at a lithium to metal M' (Li/M') ratio of 1.01 in an industrial blending equipment.

4) 1$^{st}$ sintering: the blend is sintered at 730° C. for 12 hours under an oxygen atmosphere.

The sintered powder is crushed, classified, and sieved so as to obtain a sintered intermediate product.

5) 2$^{nd}$ sintering: the intermediate product is sintered at 830° C. for 12 hours under an oxygen atmosphere so as to obtain a sintered powder of agglomerated primary particles. The sintered powder is crushed, classified, and sieved so as to obtain CEX1.3 having a formula $Li_{1.005}M'_{0.995}O_2$ (a=0.005) with $M'=Ni_{0.80}Mn_{0.10}Co_{0.10}$. CEX1.3 has a D50 of 11.7 µm and a span of 0.65. CEX1.3 comprises a trace of sulfur obtained from the metal sulfate sources in the Step 1) co-precipitation process.

CEX1.3 is not according to the present invention.

EX1 is prepared according to the same method as CEX1.2, except that CEX1.3 having a span of 0.65 is used instead of CEX1.1 and the heating temperature is 400° C. instead of 375° C. in the surface treatment process.

EX1 is according to the present invention.

EX1 has a polycrystalline morphology. This morphology can be modified into a monolithic morphology by applying the following steps 5a and 5b after the $2^{nd}$ sintering [i.e. step 5 of the manufacturing process of CEX1.3 according to the Example 1] and before the subsequent crushing, classifying and sieving steps:
5a) subjecting the sintered intermediate product to a wet ball milling step whereby agglomerated primary particles are deagglomerated and a slurry comprising deagglomerated primary particles is obtained, and
5b) separating the deagglomerated primary particles from the slurry, and heat treating the deagglomerated primary particles at a temperature between 300° C. and at least 200° C. below the temperature in the $2^{nd}$ sintering step (4) [i.e. of at most 630° C.], whereby single crystal monolithic particles are obtained.

Such a treatment to convert polycrystalline particles into monolithic particles is known from EX1 of WO2019/185349, in page 20, line 11 to page 20, line 33.

CEX1.4 is prepared according to the same method as EX1, except that the heating temperature is 550° C. in the surface treatment process. CEX1.4 is not according to the present invention.

Example 2

A polycrystalline hNMC product (CEX2.1), having the formula $Li_{1+a}(Ni_{0.83}Mn_{0.07}Co_{0.10})_{1-a}O_2$ and a span of 1.40 is obtained through a double sintering process which is a solid-state reaction between a lithium source and a transition metal-based source running as follows:
1) Co-precipitation: a transition metal-based hydroxide precursor with metal composition $M'=Ni_{0.825}Mn_{0.075}Co_{0.10}$ is prepared by a co-precipitation process in a large-scale continuous stirred tank reactor (CSTR) with mixed nickel-manganese-cobalt sulfates, sodium hydroxide, and ammonia. The transition metal-based hydroxide has a D50 of 11.8 µm and a span of 1.40.
2) Blending: the transition metal-based hydroxide and LiOH as a lithium source are homogenously blended at a lithium to metal M' (Li/M') ratio of 0.99 in an industrial blending equipment.
3) $1^{st}$ sintering: the blend is sintered at 730° C. for 12 hours under an oxygen atmosphere. The sintered powder is crushed, classified, and sieved so as to obtain a sintered intermediate product.
4) $2^{nd}$ sintering: the intermediate product is sintered at 800° C. for 12 hours under an oxygen atmosphere so as to obtain a sintered powder of agglomerated primary particles. The sintered powder is crushed, classified, and sieved so as to obtain CEX2.1 having a formula $M'=Ni_{0.825}Mn_{0.075}Co_{0.10}$. CEX2.1 has a D50 of 11.8 µm and a span of 1.40. CEX2.1 comprises a trace of sulfur obtained from the metal sulfate sources in the Step 1) co-precipitation process.

CEX2.1 is not according to the present invention.

CEX2.2, which is not according to the present invention, is prepared by the same method as CEX1.2 except that CEX2.1 is used instead of CEX1.1.

A polycrystalline hNMC powder (CEX2.3), having the formula $Li_{1+a}(Ni_{0.83}Mn_{0.07}Co_{0.10})_{1-a}O_2$ and a span of 0.36 is obtained through a double sintering process which is a solid-state reaction between a lithium source and a transition metal-based source running as follows:
1) Co-precipitation: a transition metal-based hydroxide precursor $M'O_{0.24}(OH)_{1.76}$ with metal composition $M'=Ni_{0.83}Mn_{0.07}Co_{0.10}$ is prepared by a co-precipitation process in continuous stirred tank reactor (CSTR) with a manual back-feeding process. The temperature of the CSTR is fixed at 60° C. A 2M $M'SO_4$ solution ($M'=Ni_{0.83}Mn_{0.07}Co_{0.10}$), 10M NaOH solution, and 12M $NH_4OH$ solution with a flow rate of 2 L/hour, 0.9 L/hour, and 0.4 L/hour respectively, are continuously fed into a 10 L reactor with a residence time of 3 hours. The CSTR is continuously stirred through an impeller at 1000 rpm. The precursor slurry is collected through an overflow at each hour. The collected precursor slurry is settled down and 2.8 L of clear mother-liquor is dumped. The remaining 0.5 L thick slurry is manually back-fed into the CSTR at each hour. During this procedure, the PSD of the precursor inside the CSTR is measured. When the D50-particle size of the precursor reaches 10 µm, each time 5 L of precursor slurry is collected. The collected precursor slurry is filtered and washed by de-ionized water, and then dried at 150° C. for 20 hours under N2 atmosphere, obtaining the transition metal-based hydroxide precursor having a D50 of 9.3 µm and a span of 0.36.
2) Pre-heating: the transition metal-based hydroxide precursor is pre-heated at 345° C. for 6 hours in air so as to obtain a transition metal-based oxide precursor.
3) Blending: the transition metal-based oxide and LiOH as a lithium source are homogenously blended at a lithium to metal M' (Li/M') ratio of 1.04 in an industrial blending equipment.
4) Sintering: the blend is sintered at 790° C. for 12 hours under an oxygen atmosphere. The sintered powder is crushed, classified, and sieved so as to obtain CEX2.3 having a D50 of 9.3 µm and a span of 0.36. CEX2.3 comprises a trace of sulfur obtained from the metal sulfate sources in the Step 1) co-precipitation process.

CEX2.3 is not according to the present invention.

EX2 is prepared according to the same method as CEX1.2, except that CEX2.3 having a D50 of 9.3 µm and a span of 0.36 is used instead of CEX1.1.

EX2 is according to the present invention.

Example 3

A polycrystalline hNMC powder (CEX3.1), having the formula $Li_{1+a}(Ni_{0.86}Mn_{0.05}Co_{0.10})_{1-a}O_2$ and a span of 1.31 is obtained through a double sintering process which is a solid-state reaction between a lithium source and a transition metal-based source running as follows:
1) Co-precipitation: a transition metal-based hydroxide precursor with metal composition $M'=Ni_{0.86}Mn_{0.05}Co_{0.10}$ and span of 1.31 is prepared by a co-precipitation process in a large-scale continuous stirred tank reactor (CSTR) with mixed nickel-manganese-cobalt sulfates, sodium hydroxide, and ammonia.

2) Blending: the transition metal-based hydroxide and LiOH as a lithium source are homogenously blended at a lithium to metal M' (Li/M') ratio of 1.02 in an industrial blending equipment.

3) $1^{st}$ sintering: the blend is sintered at 765° C. for 12 hours under an oxygen atmosphere. The sintered powder is crushed, classified, and sieved so as to obtain a sintered powder of agglomerated primary particles. The sintered powder is crushed, classified, and sieved so as to obtain CEX3.1 having a formula M'=$Ni_{0.86}Mn_{0.05}Co_{0.10}$. CEX3.1 has a D50 of 11.3 µm and a span of 1.33.

CEX3.1 is not according to the present invention.

CEX3.2, which is not according to the present invention, is prepared by the same method as CEX1.2 except that CEX3.1 is used instead of CEX1.1.

A polycrystalline hNMC product (CEX3.3), having the formula $Li_{1+a}(Ni_{0.86}Mn_{0.05}Co_{0.10})_{1-a}O_2$ and a span of 0.54 is obtained through a double sintering process which is a solid-state reaction between a lithium source and a transition metal-based source running as follows:

1) Co-precipitation: a transition metal-based hydroxide precursor $M'O_{0.16}(OH)_{1.84}$ with metal composition M'=$Ni_{0.86}Mn_{0.05}Co_{0.10}$ is prepared by a co-precipitation process in continuous stirred tank reactor (CSTR) with a manual back-feeding process. The temperature of the CSTR is fixed at 60° C. A 2M $M'SO_4$ solution (M'=$Ni_{0.86}Mn_{0.05}Co_{0.10}$), 10M NaOH solution, and 12M $NH_4OH$ solution with a flow rate of 2 L/hour, 0.9 L/hour, and 0.4 L/hour respectively, are continuously fed into a 10 L reactor with a residence time of 3 hours. The CSTR is continuously stirred through an impeller at 1000 rpm. The precursor slurry is collected through an overflow at each hour. The collected precursor slurry is settled down and 2.8 L of clear mother-liquor is dumped. The remaining 0.5 L thick slurry is manually back-fed into the CSTR at each hour. During this procedure, the PSD of the precursor inside the CSTR is measured. When the D50-particle size of the precursor reaches 11 µm, each time 5 L of precursor slurry is collected. The collected precursor slurry is filtered and washed by de-ionized water, and then dried at 150° C. for 20 hours under N2 atmosphere, obtaining the transition metal-based hydroxide precursor having a D50 of 11.2 µm and a span of 0.53.

2) Pre-heating: the transition metal-based hydroxide precursor is pre-heated at 365° C. for 10 hours in air so as to obtain a transition metal-based oxide precursor.

3) Blending: the transition metal-based oxide and LiOH as a lithium source are homogenously blended at a lithium to metal M' (Li/M') ratio of 1.02 in an industrial blending equipment.

4) Sintering: the blend is sintered at 765° C. for 12 hours under an oxygen atmosphere. The sintered powder is crushed, classified, and sieved so as to obtain CEX3.3 having a D50 of 11.2 µm and a span of 0.53. CEX3.3 comprises a trace of sulfur obtained from the metal sulfate sources in the Step 1) co-precipitation process.

CEX3.3 is not according to the present invention.

EX3 is prepared according to the same method as CEX1.2, except that CEX3.3 having a span of 0.53 is used instead of CEX1.1.

EX3 is according to the present invention.

Example 4

A polycrystalline hNMC powder (CEX4.1), having the formula $Li_{1+a}(Ni_{0.87}Mn_{0.03}Co_{0.10})_{1-a}O_2$ and a span of 1.41 is obtained through a double sintering process which is a solid-state reaction between a lithium source and a transition metal-based source running as follows:

1) Co-precipitation: a transition metal-based hydroxide precursor with metal composition M'=$Ni_{0.87}Mn_{0.03}Co_{0.10}$ is prepared by a co-precipitation process in a large-scale CSTR with mixed nickel-manganese-cobalt sulfates, sodium hydroxide and ammonia. The transition metal-based hydroxide has a D50 of 12.8 µm and a span of 1.41.

2) Blending: the transition metal-based hydroxide and $LiOH \cdot H_2O$ as a lithium source are homogenously blended at a Li/M' ratio of 0.99 in an industrial blending equipment.

3) Sintering: the blend is sintered at 755° C. for 12 hours under an oxygen atmosphere. After the sintering, the sintered powder is classified and sieved so as to obtain CEX4.1 having a D50 of 12.8 µm and a span of 1.41.

CEX4.1 is not according to the present invention.

CEX4.2, which is not according to the present invention, is prepared by the same method as CEX1.2 except that CEX4.1 is used instead of CEX1.1.

A polycrystalline hNMC product (CEX4.3), having the formula $Li_{1+a}(Ni_{0.87}Mn_{0.03}Co_{0.10})_{1-a}O_2$ and a span of 0.51 is obtained through a double sintering process which is a solid-state reaction between a lithium source and a transition metal-based source running as follows:

1) Co-precipitation: a transition metal-based hydroxide precursor $M'O_{0.16}(OH)_{1.84}$ with metal composition M'=$Ni_{0.87}Mn_{0.03}Co_{0.10}$ is prepared by a co-precipitation process in continuous stirred tank reactor (CSTR) with a manual back-feeding process. The temperature of the CSTR is fixed at 60° C. A 2M $M'SO_4$ solution (M'=$Ni_{0.87}Mn_{0.05}Co_{0.10}$), 10M NaOH solution, and 12M $NH_4OH$ solution with a flow rate of 2 L/hour, 0.9 L/hour, and 0.4 L/hour respectively, are continuously fed into a 10 L reactor with a residence time of 3 hours. The CSTR is continuously stirred through an impeller at 1000 rpm. The precursor slurry is collected through an overflow at each hour. The collected precursor slurry is settled down and 2.8 L of clear mother-liquor is dumped. The remaining 0.5 L thick slurry is manually back-fed into the CSTR at each hour. During this procedure, the PSD of the precursor inside the CSTR is measured. When the D50-particle size of the precursor reaches 10 µm, each time 5 L of precursor slurry is collected. The collected precursor slurry is filtered and washed by de-ionized water, and then dried at 150° C. for 20 hours under N2 atmosphere, obtaining the transition metal-based hydroxide precursor having a D50 of 9.54 µm and a span of 0.51.

2) Pre-heating: the transition metal-based hydroxide precursor is pre-heated at 365° C. for 10 hours in air so as to obtain a transition metal-based oxide precursor.

3) Blending: the transition metal-based oxide and LiOH as a lithium source are homogenously blended at a lithium to metal M' (Li/M') ratio of 1.02 in an industrial blending equipment.

4) Sintering: the blend is sintered at 765° C. for 12 hours under an oxygen atmosphere. The sintered powder is crushed, classified, and sieved so as to obtain CEX4.3 having a D50 of 9.54 µm and a span of 0.51. CEX4.3 comprises a trace of sulfur obtained from the metal sulfate sources in the Step 1) co-precipitation process.

CEX4.3 is not according to the present invention.

EX4 is prepared according to the same method as CEX1.2, except that CEX4.3 having a span of 0.52 is used instead of CEX1.1.

EX4 is according to the present invention.

Table 3 summarizes the composition, particle size distribution, and electrochemical properties of the examples and comparative examples. The total amount of aluminum (Al), sulfur (S), and sulfate ion ($SO_4^{2-}$) are evaluated as described in section A) ICP analysis. D50 and span of particles are measured by D) PSD measurement and DQ1 and IRRQ are evaluated by the method described in section F) Coin cell testing.

electrochemical performance is improved as the core of the positive electrode active material powder is sufficiently covered with the sulfate ion.

In the present invention, the S content between 0.150 wt % and 0.375 wt % in the surface layer of the hNMC powder

TABLE 3

Summary of composition, particle size distribution, and electrochemical properties of the examples and comparative examples

| | | | PSD | | ICP | | | | Sulfate ion | Coin cell | |
| | | | | | Entire hNMC powder | | | Surface layer | | surface | | |
| Sample ID | According to invention | Surface treatment | D50 (μm) | span | Ni/M' (at %) | Al (wt %) | S (wt %) | S2 (ppm) | S* (wt %) | S1 (ppm) | coverage S1/S2 | DQ1 (mAh/g) | IRRQ (%) |
|---|---|---|---|---|---|---|---|---|---|---|---|---|---|
| CEX1.1 | No | Not applied | 12.0 | 1.24 | 0.80 | 0.0015 | 0.167 | 5000 | 0.124 | 3712 | 0.74 | 195.3 | 13.9 |
| CEX1.2 | No | Applied | 12.0 | 1.24 | 0.80 | 0.1058 | 0.324 | 9691 | 0.281 | 8406 | 0.87 | 205.0 | 9.7 |
| CEX1.3 | No | Not applied | 11.7 | 0.65 | 0.81 | 0.0019 | 0.154 | 4598 | 0.112 | 3357 | 0.73 | 195.3 | 13.7 |
| CEX1.4 | No | Applied | 11.7 | 0.65 | 0.80 | 0.1113 | 0.339 | 10156 | 0.302 | 9039 | 0.89 | 195.3 | 13.4 |
| EX1 | Yes | Applied | 11.7 | 0.65 | 0.80 | 0.1031 | 0.320 | 9575 | 0.278 | 8330 | 0.87 | 206.4 | 9.9 |
| CEX2.1 | No | Not applied | 11.8 | 1.40 | 0.83 | 0.0040 | 0.070 | 2106 | 0.053 | 1580 | 0.75 | 185.7 | 19.3 |
| CEX2.2 | No | Applied | 12.0 | 1.40 | 0.82 | 0.1035 | 0.243 | 7265 | 0.209 | 6248 | 0.86 | 184.3 | 18.6 |
| CEX2.3 | No | Not applied | 9.3 | 0.36 | 0.83 | 0.0377 | 0.143 | 4278 | 0.106 | 3166 | 0.74 | 194.1 | 13.6 |
| EX2 | Yes | Applied | 9.3 | 0.36 | 0.83 | 0.1075 | 0.317 | 9495 | 0.276 | 8263 | 0.87 | 205.6 | 9.57 |
| CEX3.1 | No | Not applied | 11.3 | 1.33 | 0.86 | 0.0010 | 0.086 | 2573 | 0.069 | 2058 | 0.80 | 188.0 | 19.3 |
| CEX3.2 | No | Applied | 11.3 | 1.33 | 0.85 | 0.1037 | 0.251 | 7505 | 0.220 | 6604 | 0.88 | 189.3 | 18.9 |
| CEX3.3 | No | Not applied | 11.0 | 0.54 | 0.86 | 0.0025 | 0.248 | 7438 | 0.181 | 5431 | 0.73 | 207.6 | 11.2 |
| EX3 | Yes | Applied | 11.0 | 0.54 | 0.86 | 0.1086 | 0.410 | 12280 | 0.370 | 11085 | 0.90 | 212.3 | 8.1 |
| CEX4.1 | No | Not applied | 12.8 | 1.41 | 0.87 | 0.0019 | 0.138 | 4144 | 0.107 | 3191 | 0.77 | 194.9 | 17.8 |
| CEX4.2 | No | Applied | 12.8 | 1.41 | 0.87 | 0.1045 | 0.303 | 9076 | 0.264 | 7896 | 0.87 | 186.1 | 18.6 |
| CEX4.3 | No | Not applied | 9.5 | 0.51 | 0.88 | 0.0014 | 0.082 | 2451 | 0.061 | 1814 | 0.74 | 212.0 | 10.6 |
| EX4 | Yes | Applied | 9.5 | 0.52 | 0.87 | 0.1036 | 0.248 | 7439 | 0.214 | 6398 | 0.86 | 219.2 | 7.5 |

Figure 6:
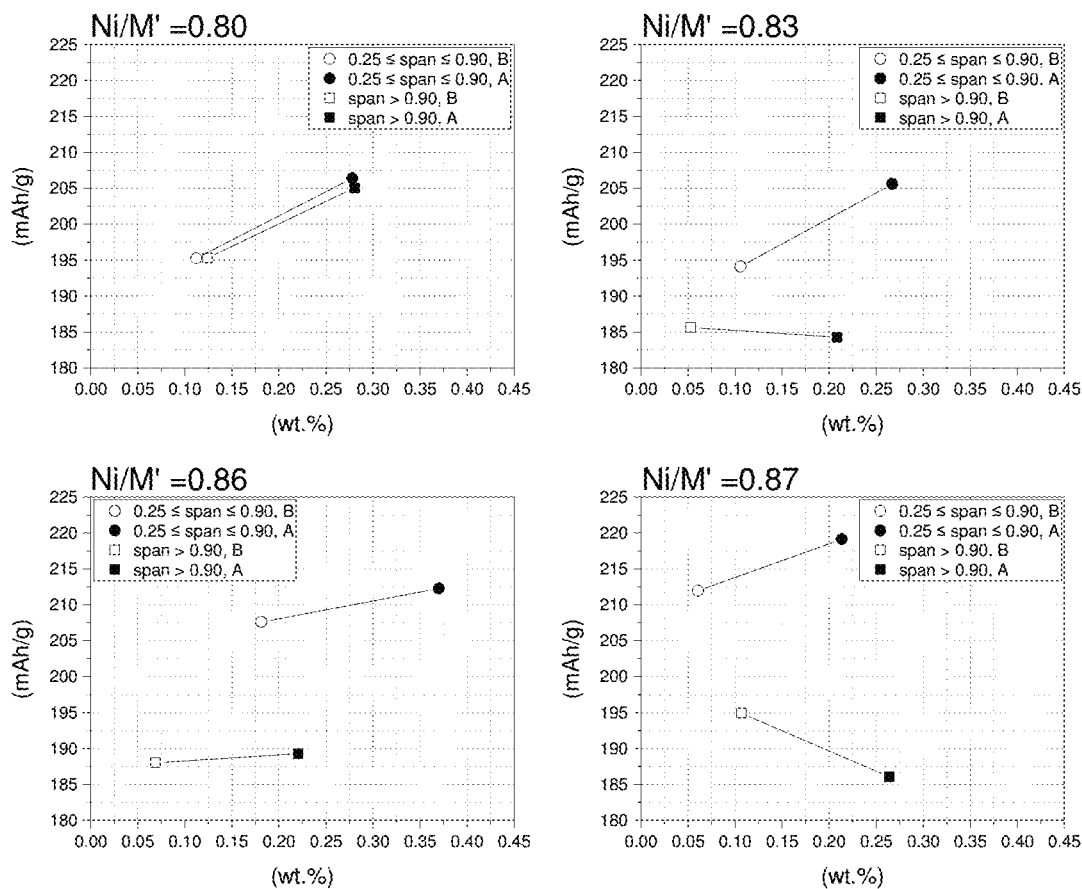
FIG. 6. Graph showing sulfur content in the surface layer versus DQ1 of examples and comparative examples, wherein B indicates before surface treatment and A indicates after surface treatment (x-axis: S* content in the surface in wt. %, y-axis DQ1 in mAh/g)

Ni/M': Ni content in the positive electrode active material particles
S*: amount of S in the surface layer
S1 and S2: amount of sulfate ion obtained according to the following equations: $S_1 = S^* $ (wt. %) $\times 2.996 \times 10000$ ppm, $S_2 = S$(wt. %) $\times 2.996 \times 10000$ ppm The relationship between the electrochemical properties, nickel content, and span of examples and comparative examples in Table 3 is displayed in a graph in FIG. 6, wherein open symbols are the comparative examples before surface treatment and filled symbols are the comparative examples and examples after surface treatment. x-axis showing S* content in the surface obtained from the washing procedure as explained in the section A) ICP analysis. It is observed that the surface treatment gives higher DQ1 improvements for the positive electrode active material having span in the range between 0.25 to 0.90 in comparison with the positive electrode active material with span higher than 0.90.

Carbon contents in CEX1.3 and EX1 are 238 ppm and 26 ppm, respectively, demonstrating carbon level improvement in the positive electrode active material after surface treatment.

To understand the sulfate ion surface coverage of the hNMC compounds prepared in Example 1, amounts of sulfate ion in the entire powder and the surface layer are investigated as described in section A) ICP analysis. The S content in the entire powder of the positive electrode active material powder is determined by ICP, and the value obtained by converting the amount of S into the amount of sulfate ion is defined as S2. Also, the filtered solution from a mixture of the hNMC powder and water is investigated by ICP. The solution contains dissolved S from the surface layer of the lithium transition metal-based oxide particles and is converted to the amount of sulfate ion, which is named S1. Finally, the sulfate ion surface coverage is determined by dividing S1 by S2. When the sulfate ion surface coverage, S1/S2, is 0.85 or more, the C content is reduced and the is preferred. In other words, the sulfate ion content between 4500 ppm to 11250 ppm in the surface layer of the hNMC powder is preferred.

XPS analysis is conducted to investigate the Al compounds and their distribution in the surface layer. CEX1.1, CEX1.2, CEX1.4, and EX1 are analyzed according to the procedure described in section B) XPS measurement.

Figure 4:
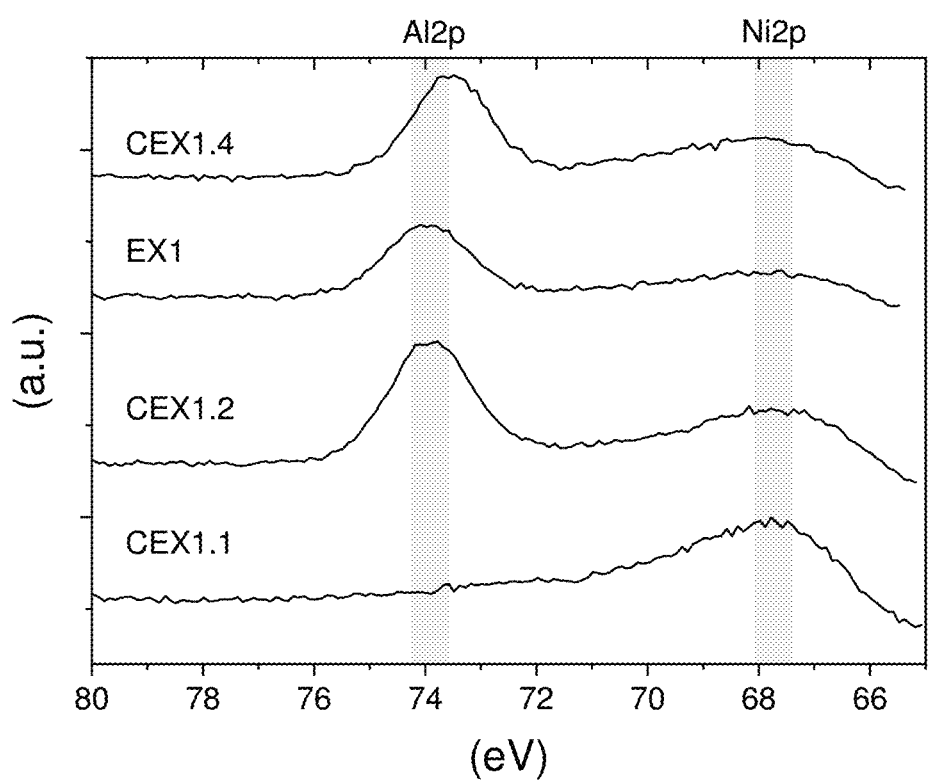
FIG. 4. Al2p and Ni3p XPS spectra of EX1, CEX1.1, CEX1.2, and CEX1.4 (x-axis: binding energy, y-axis: count)

As shown in FIG. 4 (x-axis: binding energy, y-axis: count), XPS spectra exhibits the peaks of Al2p and Ni3p having a maximum intensity at the range between 80 eV and 65 eV. CEX1.1 particles (before the surface treatment) do not contain aluminum hence shows no peak in Al range. The maximum peak intensity of Al2p of CEX1.2, CEX1.4, and EX1 are at the binding energy of 73.78 eV, 73.48, and 74.08 eV, respectively. The Al2p peak position of CEX1.2 and EX1 having a maximum intensity are indicated in Table 5. As disclosed in Chem. Mater., 2017, 19, 5748-5757, if the Al2p peak position shifts to the lower binding energy while the Ni3p peak position does not change, it indicates the presence of $LiAlO_2$ compound. A better battery performance, as shown in Table 3 is attributed to the appearance in Al2p peak in the range from 73.6 eV to 74.1 eV, corresponding to the presence of $LiAlO_2$ compounds such as in EX1.

The Al2p peak contains compounds such as $LiM''_{1-a}Al_aO_2$, $LiAlO_2$, and $Al_2O_3$, and the respective amounts of these compounds are quantified by the procedure described in section B2) XPS peak deconvolution. Table 4 shows the quantification of Al compounds. In the case of EX1, which has excellent electrochemical performances, it is confirmed that the content of Al peak2, which indicates the presence of a $LiAlO_2$ phase, is superior or equal to 0.10 at % and inferior or equal to 0.30 at % with respect to the total atomic content of M' of the positive electrode active material powder. In addition, the LiM"$_{1-a}$Al$_a$O$_2$ content is inferior to 0.14 at % with respect to the total atomic content of M' of the positive electrode active material powder. For CEX1.4, a surface treated product at high temperature such as 550° C., has the amount of Al peak1 much higher than EX2 prepared at 400° C. Therefore, the heating temperature during surface treatment is preferred at 500° C. or lower.

In order to investigate the surface coverage by Al in the positive electrode active material powder, the atomic ratio of Al/M" from XPS analysis (A1) is divided by the atomic ratio of Al/M" from ICP analysis (A2), as indicated by B4) XPS peak integration and coverage. When the value of A11/A12 is higher than or equal to 100, it means the positive electrode active material compounds have Al uniformly distributed in the surface layer. As shown Table 5, EX1 have homogeneous Al distribution in the surface layer.

TABLE 4

XPS peak deconvolution of EX1, CEX1.2, and CEX1.4

| | | Atomic ratio/M' (at %) | | |
|---|---|---|---|---|
| Sample ID | According to invention | Al peak1 (LiM"$_{1-a}$Al$_a$O$_2$) | Al peak2 (LiAlO$_2$) | Al peak3 (Al2O3) |
| CEX1.2 | No | 0.09 | 0.15 | 0.13 |
| CEX1.4 | No | 0.14 | 0.16 | 0.10 |
| EX1 | Yes | 0.05 | 0.13 | 0.18 |

TABLE 5

Al surface coverage of EX1 and CEX1.2

| | | ICP | XPS | | |
|---|---|---|---|---|---|
| Sample ID | According to invention | A2 Al/M* (at/at) | Al2p peak position (eV) | A1 Al/M* (at/at) | Al surface coverage A1/A2 |
| CEX1.2 | No | 0.0038 | 73.78 | 0.528 | 139 |
| EX1 | Yes | 0.0037 | 74.08 | 0.562 | 152 |

M* = Ni + Mn + Co + Al + S

Figure 5A:
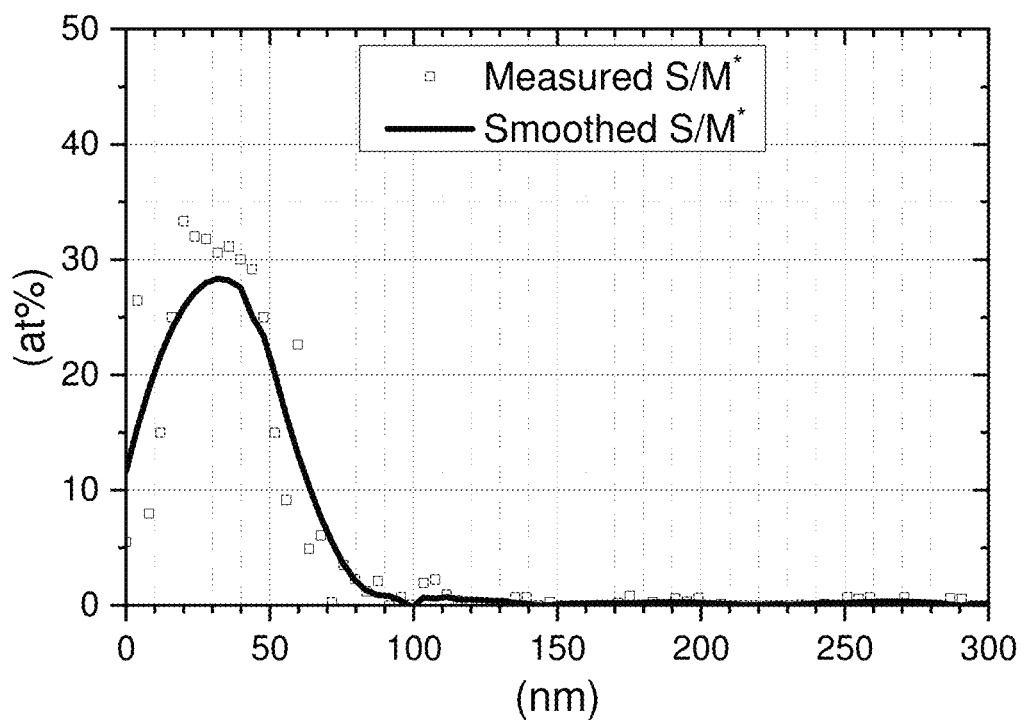
FIG. 5A. TEM-EDS analysis result of S/M* of CEX1.2 (x-axis: distance where 0 is the starting point of the surface layer, y-axis: element in atomic ratio)
Figure 5B:
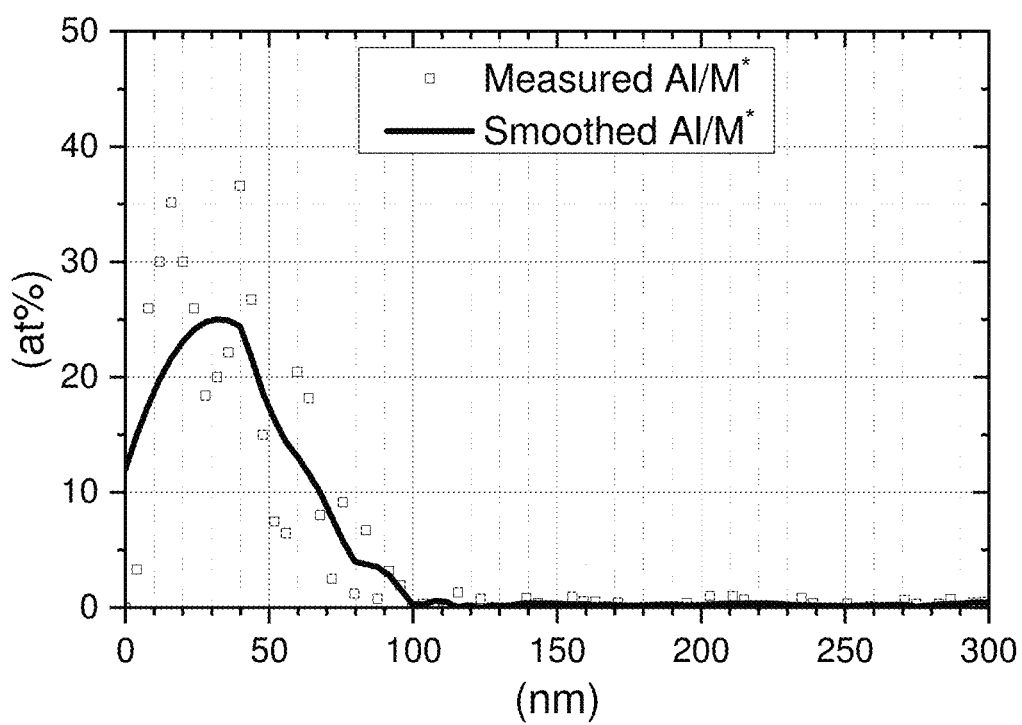
FIG. 5B. TEM-EDS analysis result of Al/M* of CEX1.2 (x-axis: distance where 0 is the starting point of the surface layer, y-axis: element in atomic ratio)

The surface layer of CEX1.2 is confirmed as described in section E) TEM-EDS measurement, and the results is shown in FIG. 5A and FIG. 5B (x-axis: distance where 0 is the starting point of the surface layer, y-axis: element in atomic ratio). A cross-section sample prepared by SEM-FIB is investigated in a TEM/EDS equipment, and the Al and S content of the sample in an atomic ratio is obtained by dividing by the total amount of transition metals, Al, and S.

It is shown in FIG. 5A that the S/M* ratio reaches 0 at % at a linear distance (or distance) of 100 nm from the external edge of the surface layer of the particles. The thickness of the surface layer of CEX1.2 particles is therefore of 100 nm.

FIG. 5B shows that the total content of aluminum is contained in the 100 nm thickness surface layer of CEX1.2 particles.

This is indeed expected since CEX1.1 particles (before the surface treatment) do not contain aluminum.

The TEM-EDS line profiling measurement result of the surface treated positive electrode active material including EX1, EX2, and EX3, are the same as CEX1.2.

In the case of a hNMC containing aluminum as a dopant present in its core, meaning before the surface treatment is applied, the amount of aluminum in a surface layer (Al$_{surface}$) with respect to the total amount of aluminum in the positive electrode active material powder after the surface treatment is applied (Al$_{total}$) of the hNMC according to the invention is obtained by the following procedure:

1) Firstly, the total amount of aluminum in the positive electrode active material powder (Al/M*$_{ICP}$) is obtained by ICP analysis.

2) Secondly, an elemental line profile of a cross section of a particle is measured by techniques such as EDS and/or EELS (Electron Energy Loss Spectroscopy).

3) Thirdly, the thickness of the surface layer is determined based on the sulfur content evolution with respect to the distance from the external edge of the particles (a distance from the external edge of the surface layer to a point in the particle when S/M*=0 or S/M* is constant), said minimal distance D being defined as:

$$D(\text{in nm}) = L_{S1} - L_{S2},$$

wherein $L_{S1}$ is a first point location at the edge of a particle, $L_{s2}$ is a second point location in a line defined between said first point location and a geometric center of said particle, wherein a content of S is measured by TEM-EDS at the second point location $L_{s2}$ is superior or equal to 0 at % and inferior or equal to 5.0 at % of a content of S measured at the first point location ($L_{S1}$), said second content of S ($S_2$) being defined as:

$$S_2(\text{in at \%}) = S_3 \pm 0.1 \text{ at \%},$$

$S_3$ being a content of S (in at %) at a third point location (LS$_3$) in said line, said third point being located at any location between the geometric center of said particle and the second point location $L_{s2}$.

4) Fourthly, an Area1 parameter is obtained by integrating Al/M* on a distance in the surface layer in the one-dimensional line profile (cfr. FIG. 5B) and an Area2 parameter is obtained by integrating Al/M* by a distance from the external edge of the surface layer to the center of a particle. Assuming that a particle is spherical and the surface layer is uniform, Area1 and Area2 are used to calculate the atomic ratio of Al$_{surface}$ to Al$_{total}$ by a following equation.

$$Al_{surface}/Al_{total} = \frac{\frac{4}{3}\pi(Area2)^3 - \frac{4}{3}\pi(Area2 - Area1)^3}{\frac{4}{3}\pi(Area2)^3} \times 100 \text{ (at \%)}$$

The amount of aluminum in a surface layer with respect to total atomic content of M' in the positive electrode active material powder is obtained by multiplying the Al/M*$_{ICP}$ ratio to the Al$_{surface}$/Al$_{total}$ ratio, according to the following equation: Al/M*$_{ICP}$*Al$_{surface}$/Al$_{total}$.

TABLE 6

Summary of the invention and the process related thereto

| Claim | Features | Link to the manufacturing process according to EX1 |
|---|---|---|
| 1 | Surface layer comprising sulfur in a content superior or equal to 0.150 wt % and inferior or equal to 0.375 wt % with respect to the total weight of the positive electrode active material powder. | The amount of sulfur, which further can be converted into sulfate ion, is proportional to the amount of $Al_2(SO_4)_3 \cdot 16H_2O$ added in the preparation of EX1 from CEX1.3. The initial sulfur amount on the surface of the positive electrode active material particles is represented by S* value of CEX1.1 in Table 3. Accordingly, the addition of 150-1400 ppm Al using $Al_2(SO_4)_3 \cdot 16H_2O$ compound produces positive electrode active material powder surface layer comprising sulfur in the content superior or equal to 0.150 wt % and inferior or equal to 0.375 wt %. |
| 6 | $LiAlO_2$ phase being present in the surface layer in a content superior or equal to 0.10 at % and inferior or equal to 0.30 at % with respect to the total atomic content of M' in the positive electrode active material powder, said $LiM''_{1-a}Al_aO_2$ phase being present in the surface layer in a content superior or equal to 0 at % and inferior or equal to 0.14 at % with respect to the total atomic content of M' in the positive electrode active material powder. | The amount of $LiAlO_2$ and $LiM''_{1-a}Al_aO_2$ phase is related to the heating temperature of the CEX1.1 blend with $Al_2(SO_4)_3 \cdot 16H_2O$ as described in preparation of CEX1.2. When the heating temperature is in the range of 300° C.-500° C., there are more $LiAlO_2$ phase in the surface in comparison with the amount of $LiM''_{1-a}Al_aO_2$ or $Al_2O_3$. On the other hand, when the heating temperature is higher than 500° C., there are more $LiM''_{1-a}Al_aO_2$ phase in the surface in comparison with the amount of $LiAlO_2$ or $Al_2O_3$. |

Table 6 summarizes the preparation process of the positive electrode active material according to this invention to achieve the claimed features.

The invention claimed is:

1. A positive electrode active material powder suitable for lithium-ion batteries, comprising lithium transition metal-based oxide particles, the particles comprising a core and a surface layer, the surface layer being on top of the core, the particles comprising the elements:
Li, M' and oxygen, wherein M' has a formula: $M'=Ni_zMn_yCo_xA_k$, wherein A is a dopant, $0.80 \leq z \leq 0.87$, $0.05 \leq y \leq 0.20$, $0.05 \leq x \leq 0.20$, $x+y+z+k=1$, and $k \leq 0.01$,
the positive electrode active material powder having a median particle size D50 ranging from 5 µm to 15 µm, a span ranging from 0.25 to 0.90, and a surface layer thickness ranging from 10 nm to 200 nm,
the surface layer comprising:
sulfur in a content superior or equal to 0.150 wt % and inferior or equal to 0.375 wt % with respect to the total weight of the positive electrode active material powder, and
aluminum in a content superior or equal to 0.05 wt % and inferior or equal to 0.15 wt % with respect to the total weight of the positive electrode active material powder, wherein the lithium transition metal-based oxide particles have an Al surface coverage value A1/A2 that is superior or equal to 100, which indicates a uniform spatial distribution of Al in the surface layer, wherein A1 is an atomic ratio Al/(Ni+Mn+Co+Al+S) of the elements Al, Ni, Mn, Co, and S contained in the surface layer, the atomic ratio A1 being obtained by XPS spectrum analysis and wherein A2 is an atomic ratio Al/(Ni+Mn+Co+Al+S) obtained by ICP.

2. The positive electrode active material powder according to claim 1, having a carbon content of less than 200 ppm.

3. The positive electrode active material powder according to claim 1, having a Li/(Ni+Mn+Co+A) atomic ratio or a Li/(Ni+Mn+Co+A+Al) atomic ratio superior or equal to 0.96 and inferior or equal to 1.05.

4. The positive electrode active material powder according to claim 1, wherein the surface layer exhibits an Al2p peak with a maximum peak intensity in the binding energies range from $73.0 \pm 0.2$ eV to $74.5 \pm 0.2$ eV, the intensity being obtained by XPS spectrum analysis.

5. The positive electrode active material powder according to claim 1, wherein the surface layer of lithium transition metal-based oxide particles have sulfate ion ($SO_4^{2-}$) in a content superior or equal to 4500 ppm and inferior or equal to 11250 ppm.

6. The positive electrode active material powder according to claim 1, wherein the lithium transition metal-based oxide particles have a sulfate ion surface coverage S1/S2 that is superior to 0.85 and inferior or equal to 1.00, wherein S1 is an amount of sulfate ion contained in the surface layer, and wherein S2 is a total amount of sulfate ion contained in the particles.

7. The positive electrode active material powder according to claim 2, having a general formula: $Li_{1+a'}((Ni_{z'}Mn_{y'}Co_{x'}Al_{v}S_{w})_{1-k}A_k)_{1-a'}O_2$, wherein only A is a dopant, wherein $0.80 \leq z' \leq 0.87$, $0.05 \leq y' \leq 0.20$, $0.05 \leq x' \leq 0.20$, $x'+y'+z'+v+w+k=1$, $0.0018 \leq v \leq 0.0053$, $0.006 \leq w \leq 0.012$, $-0.05 \leq a' \leq 0.05$, and $k \leq 0.01$.

8. The positive electrode active material powder according to claim 1, wherein A is either one or more of Al, B, S, Mg, Zr, Nb, W, Si, Ba, Sr, Ca, Zn, Cr, V, Y, and Ti, wherein the amount of each of the elements of A is superior to 100 ppm with respect to the total weight of the positive electrode active material powder.

9. The positive electrode active material powder according to claim 1, wherein the thickness of the surface layer corresponds to a minimal distance D defined either as:

$$D(\text{in nm}) = L_{S1} - L_{S2},$$

wherein $L_{S1}$ is a first point location at the center of a particle, $L_{S2}$ is a second point location in a line defined between the first point location and a geometric center of the particle, wherein a content of S is measured by TEM-EDS at the second point location $L_{S2}$ is superior or equal to 0 at % and inferior or equal to 5.0 at % of a content of S measured at the first point location, the second content of S ($S_2$) being defined as:

$S_2$(in at %)=$S_3$±0.1 at %, $S_3$ being a content of S (in at %) at a third point location ($LS_3$) in the line, the third point being located at any location between the geometric center of the particle and the second point location $L_{S2}$.

10. The positive electrode active material powder according to claim 9, wherein:

$S_1-S_2 \geq 10.0$ at %

$S_1$ being the first content of S (in at %) at the first point location ($L_{S1}$).

11. The positive electrode active material powder according to claim 9, wherein Al is present in the surface layer in a content/defined as:

$$l \text{ (mol \%)} = \left(\frac{Al}{M^*}\right)_{ICP} \times \left(Al_{surface}/Al_{total}\right)$$

with:

$$\left(\frac{Al}{M^*}\right)_{ICP}$$

is the atomic ratio of Al content on M* content in the powder measured by ICP, and $$Al_{surface}/Al_{total} = \frac{\frac{4}{3}\pi(Area2)^3 - \frac{4}{3}\pi(Area2 - Area1)^3}{\frac{4}{3}\pi(Area2)^3} \times 100$$

wherein:
$Al_{surface}$ is the content of Al in at % in the surface layer measured by EDS;
$Al_{total}$ is the total content of Al in at % in the particles of the powder measured by EDS;
Area1 is the integral of the Al/M* content measured by cross-section-TEM-EDS over D:

$$Area1 \text{ (at \%/at \%)} = \int_{x=0}^{x=D} \frac{Al}{M^*}(x),$$

where:
Al(x) is the atomic content of Al at a point x of a cross sectional particle measured by cross-section-TEM EDS,
M*(x) is the atomic content of Ni, Mn, Co, Al, and S, at a point x of a cross sectional particle measured by cross-section-TEM EDS, and
x is the distance expressed in nm measured by TEM between the first and second point locations, Area2 is the integral of the Al/M* content measured by cross-SEM EDS over a distance C:

$$Area2 \text{ (at \%/at \%)} = \int_{x=0}^{x=C} \frac{Al}{M^*}(x),$$

where:
Al(x) is the atomic content of Al at a point x of a cross sectional particle measured by cross-section-TEM EDS,
M'(x) is the atomic content of Ni, Mn, Co, Al, and S, at a point x of a cross sectional particle measured by cross-section-TEM EDS, and
x is the distance expressed in nm and measured by TEM between the first point location (at x=0nm) and the geometric center of the particle (at x=C), wherein C ranges from 2.5 μm to 7.5 μm.

12. Process for the manufacturing of a positive electrode active material according to claim 1, comprising the consecutive steps of:
a) preparing a lithium transition metal-based oxide compound,
b) mixing the lithium transition metal-based oxide compound with a source of sulfate ion, and with water, thereby obtaining a mixture, and
c) heating the mixture in an oxidizing atmosphere in a furnace at a temperature between 350° C. and less than 500° C., for a time between 1 hour and 10 hours so as to obtain the positive electrode active material powder according to the present invention.

13. A battery comprising the positive electrode active material powder according to claim 1.

14. An electric vehicle or a hybrid electric vehicle comprising the battery according to claim 13.

15. The positive electrode active material powder according to claim 1, wherein the surface layer of lithium transition metal-based oxide particles comprises a LiAlO$_2$ phase and an LiM''$_{1-a}$Al$_a$O$_2$ phase with M'' comprising: Ni, Mn, and Co, the LiAlO$_2$ phase being present in the surface layer in a content superior or equal to 0.10 at % and inferior or equal to 0.30 at % with respect to the total atomic content of M' in the positive electrode active material powder, the LiM''$_{1-a}$Al$_a$O$_2$ phase being present in the surface layer in a content inferior to 0.14 at % with respect to the total atomic content of M' in the positive electrode active material powder.

\* \* \* \* \*